United States Patent
Sasaki

(10) Patent No.: US 11,434,846 B2
(45) Date of Patent: Sep. 6, 2022

(54) ENGINE CONTROL DEVICE

(71) Applicant: DENSO CORPORATION, Kariya (JP)

(72) Inventor: Keiji Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/015,245

(22) Filed: Sep. 9, 2020

(65) Prior Publication Data

US 2021/0071611 A1 Mar. 11, 2021

(30) Foreign Application Priority Data

Sep. 11, 2019 (JP) .............................. JP2019-165588
Jun. 16, 2020 (JP) .............................. JP2020-103710

(51) Int. Cl.
*F02D 41/26* (2006.01)
*F02D 41/22* (2006.01)
*G06F 9/22* (2006.01)
*G06F 1/24* (2006.01)

(52) U.S. Cl.
CPC ............. *F02D 41/26* (2013.01); *F02D 41/22* (2013.01); *G06F 1/24* (2013.01); *G06F 9/223* (2013.01); *F02D 2200/101* (2013.01); *F02D 2200/501* (2013.01)

(58) Field of Classification Search
CPC .... F02D 41/26; F02D 41/22; F02D 2200/501; F02D 2200/101; F02D 2250/26; F02D 2041/227; G06F 9/223; G06F 1/24; G06F 2201/81; G06F 11/0739; G06F 11/0751; G06F 11/0793
See application file for complete search history.

(56) References Cited

U.S. PATENT DOCUMENTS

| 5,036,812 A * | 8/1991 | Fukui ...................... F02D 41/08 123/585 |
| 10,273,895 B1 * | 4/2019 | Johri ...................... F02D 41/065 |
| 10,883,566 B2 * | 1/2021 | Gerty ...................... F16F 15/264 |
| 2009/0281690 A1 * | 11/2009 | Sasaki ............... G11C 29/56008 711/E12.001 |
| 2011/0144852 A1 * | 6/2011 | Kobayashi ........... G07C 5/0808 701/31.4 |
| 2013/0238219 A1 * | 9/2013 | Ando ...................... F02D 45/00 701/101 |

(Continued)

FOREIGN PATENT DOCUMENTS

| JP | 2003155954 A * | 5/2003 |
| JP | 2004-265322 A | 9/2004 |
| JP | 2019-094889 A | 6/2019 |

*Primary Examiner* — Kurt Philip Liethen
(74) *Attorney, Agent, or Firm* — Posz Law Group, PLC

(57) ABSTRACT

An engine control device for controlling an engine of a vehicle includes a microcomputer for executing an engine control process, and an abnormality detection unit for detecting an abnormality of the microcomputer. A reset execution unit executes a process of causing an external monitor IC to reset the microcomputer on condition that the abnormality of the microcomputer is detected and an engine rotation speed is higher than a threshold engine speed value. The microcomputer may alternatively be reset on condition that a vehicle speed is higher than a threshold vehicle speed value, or that all or a part of torque output from the engine is able to be supplemented by another vehicle drive power source.

17 Claims, 22 Drawing Sheets

(56) References Cited

U.S. PATENT DOCUMENTS

| | | | |
|---|---|---|---|
| 2015/0128905 A1* | 5/2015 | Levijoki | F02D 41/1495 |
| | | | 123/435 |
| 2015/0178144 A1 | 6/2015 | Aoki | |
| 2017/0002763 A1* | 1/2017 | Oono | F02D 41/22 |
| 2019/0188927 A1* | 6/2019 | Kageyama | B60W 50/045 |
| 2019/0315341 A1* | 10/2019 | Ashrafi | B60W 50/0225 |

* cited by examiner

ENGINE CONTROL DEVICE

CROSS REFERENCE TO RELATED APPLICATION

The present application claims the benefit of priority from Japanese Patent Applications No. 2019-165588 filed on Sep. 11, 2019 and No. 2020-103710 filed on Jun. 16, 2020. The entire disclosures of the above applications are incorporated herein by reference.

FIELD

The present disclosure relates to an engine control device that controls an engine of a vehicle.

BACKGROUND

In a conventional electronic control device for controlling an engine of a vehicle, a microcomputer is reset by a reset signal when an operation abnormality of the microcomputer that controls the engine is detected.

An engine control device configured so that the microcomputer is always reset when an abnormality is detected in the microcomputer is difficult to meet the demand to keep the vehicle running as much as possible even when an abnormality occurs. This demand is demanded for, for example, an autonomous vehicle.

SUMMARY

The present disclosure provides an engine control device that enables a vehicle to continue traveling even when an abnormality occurs.

According to one aspect of the present disclosure, an engine control device comprises a microcomputer and a reset execution unit and an abnormality detection unit.

The microcomputer executes at least a control process for an engine of a vehicle. The reset execution unit resets the microcomputer when a specified condition is satisfied. The abnormality detection unit detects an abnormality of the microcomputer.

The reset execution unit includes a condition determination unit. The condition determination unit determines whether a continuation possible condition, which is a predetermined condition under which the vehicle can continue traveling even if the microcomputer is reset by the reset execution unit.

DETAILED DESCRIPTION OF THE EMBODIMENT

Embodiments of an engine control device according to the present disclosure will be described below with reference to the drawings.

1. First Embodiment

1-1. Configuration

Figure 1:
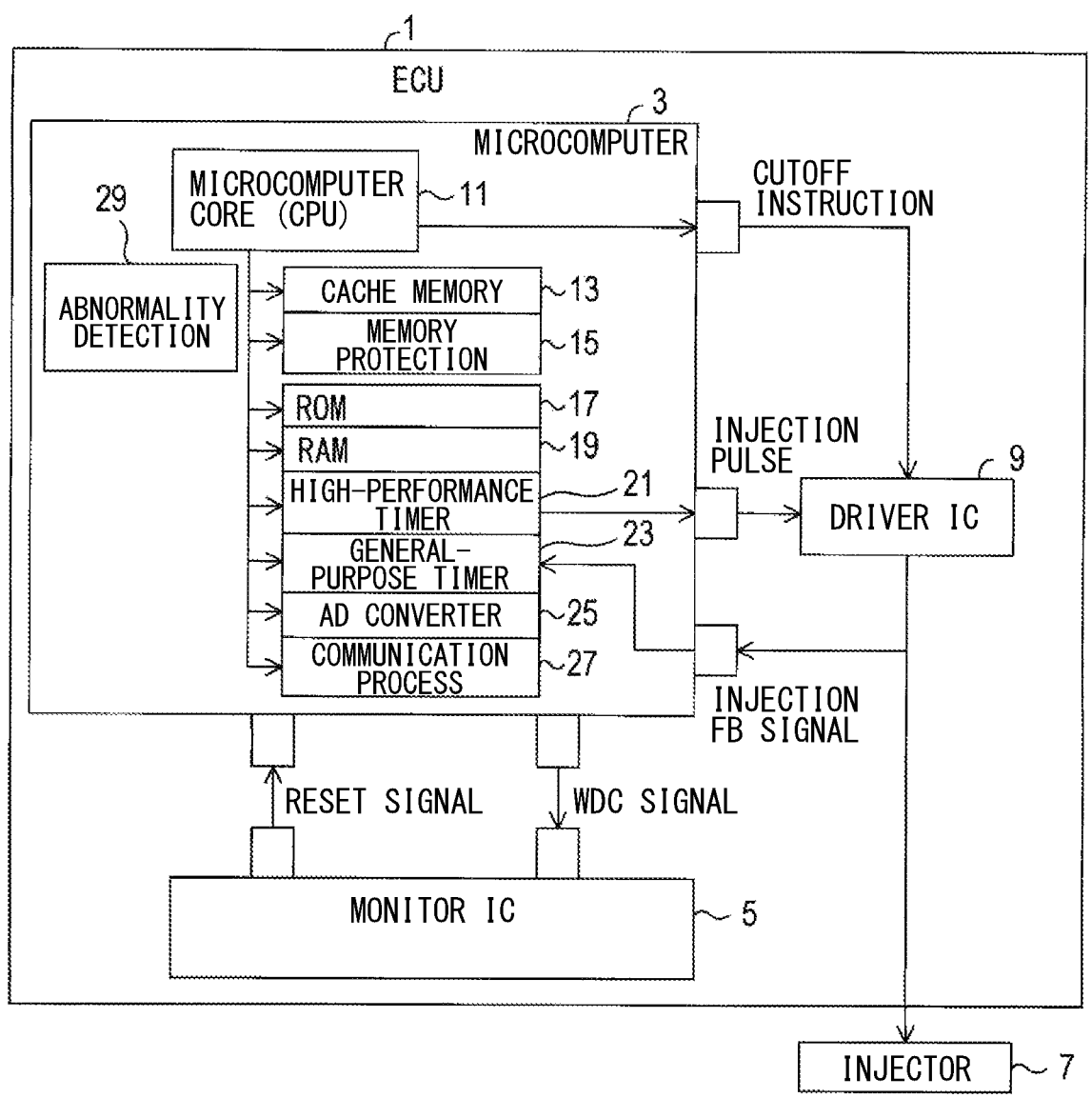
FIG. 1 is a block diagram showing a configuration of an engine control device according to the first embodiment.

An electronic control unit (hereinafter referred to as ECU) 1 shown in FIG. 1 is a device that is configured to control an engine mounted on a vehicle, that is, an engine control device. "ECU" is an abbreviation of an electronic control unit.

The ECU 1 includes a microcomputer 3 as a control unit that controls the operation of the ECU 1. The microcomputer 3 executes at least a process for controlling the engine (that is, engine control process). The engine control process includes, for example, processing of fuel injection control and processing of fuel pressure control. Further, the ECU 1 includes a monitor IC 5 that monitors the operation of the microcomputer 3, and a driver IC 9 that drives an injector 7.

The injector 7 is a device that injects fuel into the engine. The driver IC 9 drives the injector 7 in response to an injection pulse as a drive instruction output from the microcomputer 3. A drive current or drive voltage output from the driver IC 9 to the injector 7 is converted into an injection FB signal indicating a fuel injection state by a signal input circuit (not shown), and the injection FB signal is input to the microcomputer 3. "FB" is an abbreviation of feedback. The driver IC 9 is configured to stop driving the injector 7 regardless of the injection pulse, when a cutoff instruction is applied from the microcomputer 3.

The microcomputer 3 includes a microcomputer core (hereinafter referred to as CPU) 11, a cache memory 13, a memory protection mechanism 15, a ROM 17, a RAM 19, a high-performance timer 21, a general-purpose timer 23, an AD converter 25, a communication processing unit 27, and an abnormality detection unit 29.

The CPU 11 executes programs stored in the ROM 17. The memory protection mechanism 15 permits writing to the cache memory 13 or the RAM 19 when a predetermined specific condition is satisfied. The high-performance timer 21 is a timer used for calculating an engine speed, and outputting the injection pulse to the driver IC 9. The engine speed is the number of rotations of the engine (that is, rotation speed). The engine speed is calculated based on a time interval of a pulse signal output from a crank sensor (not shown). The general-purpose timer 23 is a timer used for time measurement other than time measurement by the high-performance timer 21, such as time measurement for timer interrupt operation. The communication processing unit 27 executes a process for communicating with a device external to the ECU 1. The communication protocol executed by the communication processing unit 27 may be CAN (controller area network). CAN is a registered trademark.

The abnormality detection unit 29 is a unit having a function of detecting an abnormality of the microcomputer 3. The abnormality detection unit 29 may be configured by hardware different from other components of the microcomputer 3, or may be implemented by, for example, programs executed by the CPU 11 or a CPU different from the CPU 11.

The abnormality detection unit 29 is configured to detect such abnormalities (1) to (3) as exemplified below.

(1) The abnormality detection unit 29 causes the CPU 11 to execute a test calculation, and determines that the CPU 11 is abnormal when the result of the test calculation is different from an expected value.

(2) The abnormality detection unit 29 detects an abnormality of the high-performance timer 21 by comparing a free-run counter value of the high-performance timer 21 with a free-run counter value of the general-purpose timer 23.

(3) The abnormality detection unit 29 detects a data error in a memory. The memory referred to here includes at least one of the cache memory 13, RAM 19 and ROM 17.

Further, the CPU 11 executes a predetermined program stored in the ROM 17 to execute a torque monitor process as an output monitor process for ensuring safety of engine control (that is, functional safety). The torque monitor process is processing of suppressing an output of the engine when it is determined that the power output of the engine is not controlled to the output calculated by the microcomputer 3 (that is, target output).

The torque monitor process is executed, for example, at regular intervals.

For example, the CPU 11 determines in the torque monitor process whether an unintended torque increase has occurred. The term "unintended" as used herein means that a driver of the vehicle does not intend. Specifically, the CPU 11 calculates an actual fuel injection amount actually supplied into the engine based on the injection FB signal input to the microcomputer 3, and calculates an actual output torque of the engine (hereinafter, referred to as an actual torque) based on the calculated actual fuel injection amount. Further, the CPU 11 compares the calculated actual torque with a target output torque in engine control (hereinafter referred to as a target torque), and determines that an unintended torque increase has occurred when the actual torque is larger than the target torque by a predetermined value or more. In case that the CPU 11 determines that the unintended increase in torque has occurred, it outputs the above-described fuel cutoff instruction to the driver IC 9 to forcibly stop fuel injection into the engine. Thereby, unintentional acceleration of the vehicle is suppressed.

Further, the CPU 11 executes a process of outputting a watchdog timer clear signal (hereinafter referred to as a WDC signal) from the microcomputer 3 to the monitor IC 5 every time within a predetermined time Ta.

On the other hand, the monitor IC 5 determines whether an output stop time of the WDC signal from the microcomputer 3 is equal to or longer than a specified time Tb longer than the predetermined time Ta by a built-in timer in the monitor IC 5 (that is, a watchdog timer). When the output stop time of the WDC signal exceeds the specified time Tb, the monitor IC 5 determines that the output of the WDC signal has stopped, and outputs a reset signal to a reset terminal of the microcomputer 3 for a predetermined reset time.

1-2. Processing Operation

Next, a reset control process executed by the CPU 11 for resetting the microcomputer 3 will be described with reference to the flowchart of FIG. 2. The reset control process of FIG. 2 may be repeatedly executed, for example, at regular time intervals.

Figure 2:
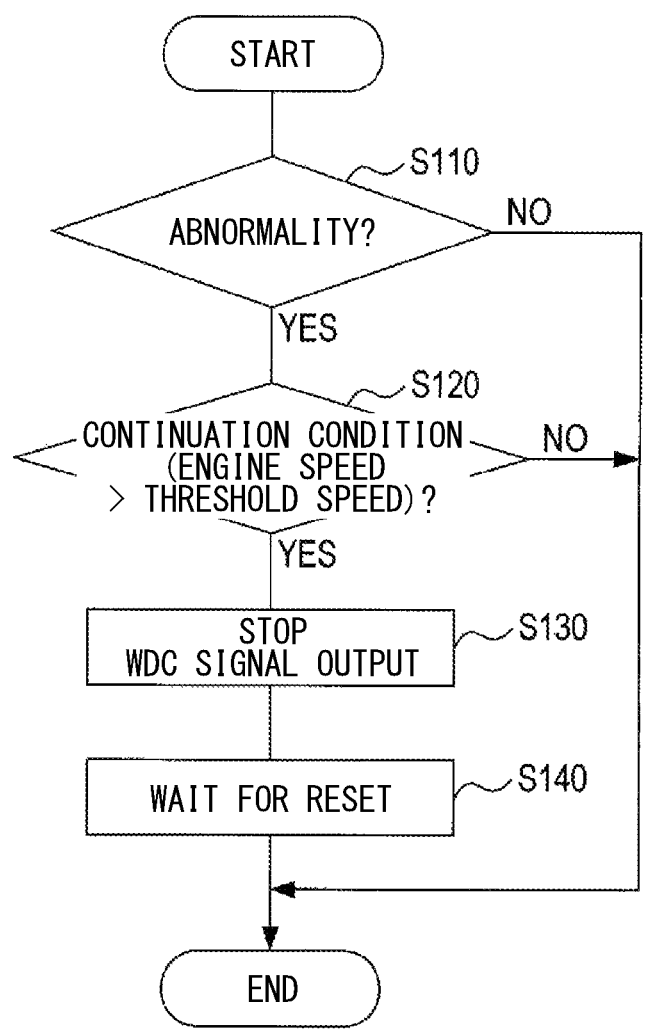
FIG. 2 is a flowchart of a reset control process executed in the first embodiment.

As shown in FIG. 2, the CPU 11 determines in S110 whether the abnormality detection unit 29 has detected an abnormality of the microcomputer 3. When no abnormality is detected, the reset control process is finished.

When the CPU 11 determines in S110 that the abnormality of the microcomputer 3 has been detected, the CPU 11 further determines at S120 whether the engine speed is higher than a threshold engine speed value Na. The threshold engine speed value Na is set to be equal to or higher than a minimum value of the engine speed that the engine does not stop if the microcomputer 3 is reset by the reset signal from the monitor IC 5 and then restarts the engine control after resetting. The threshold engine speed value Na may be set based on an experiment or may be set based on a design calculation.

Even if the microcomputer 3 is reset, the vehicle can continue to run if the engine control is restarted before the engine is stops. In the present embodiment, the condition checked in S120, that is, the condition that the engine speed is higher than the threshold engine speed value Na, is a predetermined continuation condition (hereinafter referred to as continuation condition) that enables the vehicle to continue running even if the microcomputer 3 is reset by the reset signal.

When the CPU 11 determines in S120 that the engine speed is not higher than the threshold engine speed value Na, the reset control process is finished.

When the CPU 11 determines in S120 that the engine speed is higher than the threshold engine speed value Na, the CPU 11 stops outputting in S130 the WDC signal to the monitor IC 5 as a process for resetting the microcomputer 3. Then, in S140, the CPU 5 waits for the microcomputer 3 to be reset by the reset signal from the monitor IC 5.

1-3. Effect

According to the first embodiment described in detail above, the following effect is achieved.

The microcomputer 3 is reset during the predetermined reset time on condition that the abnormality of the microcomputer 3 has been detected and the continuation condition is satisfied. Therefore, even when the microcomputer 3 is reset, it is possible to restart the microcomputer 3 and execute the control of the engine while the vehicle can continue traveling.

Specifically, the microcomputer 3 is reset for the predetermined reset time on condition that the abnormality of the microcomputer 3 has been detected and the engine speed is higher than the threshold engine speed value Na. Therefore, when the abnormality occurs in the microcomputer 3, the microcomputer 3 can be reset for normalization under the condition that the engine speed is higher than the threshold engine speed value Na. Therefore, even when the microcomputer 3 is reset and the engine control is stopped, it is possible to restart the microcomputer 3 and restart the engine control while the engine is still running by inertia. Therefore, it is easy to continue traveling of the vehicle as much as possible even when an abnormality occurs.

In the first embodiment, the CPU 11 functions as a reset execution unit by executing the reset control process of FIG. 2. S110 to S130 in the reset control process of FIG. 2 correspond to a process as a reset execution unit. Further, S120 corresponds to a process as a condition determination unit that determines whether the continuation condition is satisfied, and also corresponds to a process as a rotation speed determination unit described above.

2. Second Embodiment

2-1. Difference from First Embodiment

Since a basic configuration of the second embodiment is the same as that of the first embodiment, only differences from the first embodiment will be described below. The same reference numerals and symbols as in the first embodiment denote the same structural components and operations, and reference is made to the preceding description.

Figure 3:
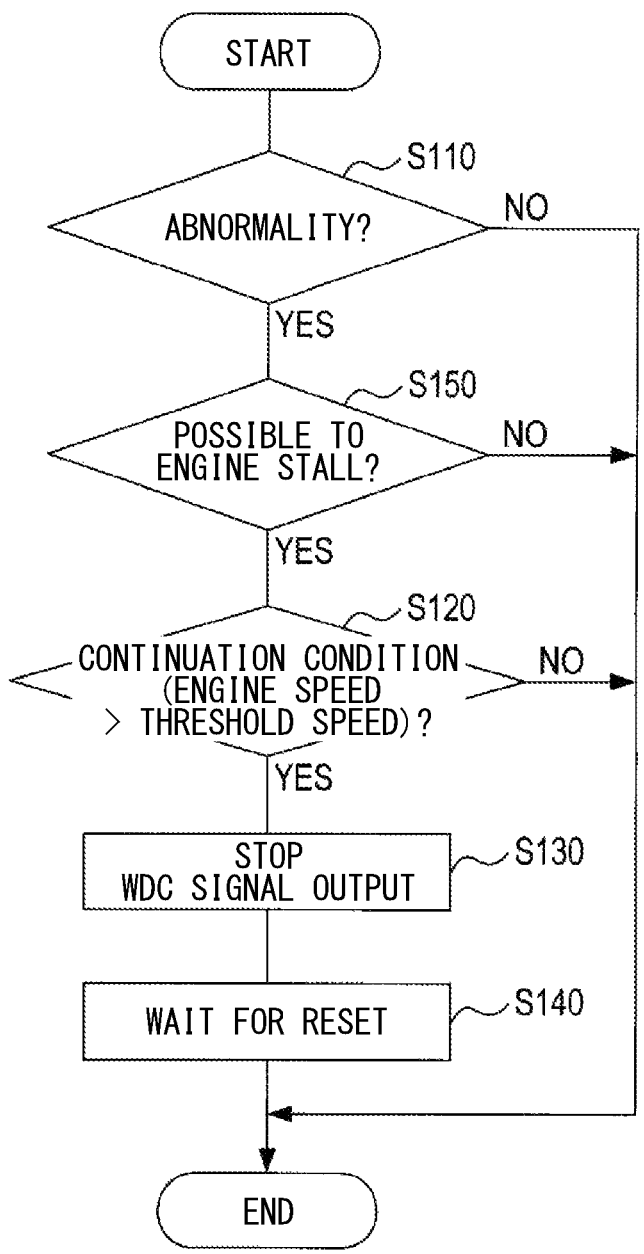
FIG. 3 is a flowchart of a reset control process executed in the second embodiment.

The ECU 1 of the second embodiment is different from that of the first embodiment in that the CPU 11 executes a reset control process of FIG. 3 instead of the reset control process of FIG. 2.

2-2. Processing

The reset control process of FIG. 3 is different from the reset control process of FIG. 2 in that S150 is added.

As shown in FIG. 3, when the CPU 11 determines in S110 that the abnormality of the microcomputer 3 has been detected in S110, the CPU 11 determines in S150 whether there is a possibility of engine stall. The engine stall is an engine stop that is not intended by the driver of the vehicle.

In S150, the CPU 11 determines whether the abnormality detected by the abnormality detection unit 29 is an abnormality that may lead to engine stalling (that is, unintended engine stop), which is referred to as an engine-stall possibility abnormality, and engine stalling is possible. If it is the engine-stall possibility abnormality, it is determined that there is a possibility of stalling.

For example, among abnormalities of the microcomputer 3, the abnormality of the high-performance timer 21 used to output the injection pulse is one example of the engine-stall possibility abnormality. A data error in a storage area used for engine control among the storage areas of the RAM 19 or the ROM 17 is also an example of the engine-stall possibility abnormality. On the other hand, among the storage areas of the RAM 19 or the ROM 17, a data error in a storage area that is not used for engine control or an abnormality of the communication processing unit 27 is an abnormality that may not lead to the engine stall (hereinafter referred to as a non-stall possibility abnormality).

When the CPU 11 determines in S150 that there is no possibility of engine stalling, that is, when the abnormality detected by the abnormality detection unit 29 is the non-stalling possibility abnormality, the CPU 11 finishes the reset control process.

When the CPU 11 determines in S150 that there is a possibility of engine stall, that is, when the abnormality detected by the abnormality detection unit 29 is the engine-stall possibility abnormality, the CPU 11 further determines in S120 whether engine speed is higher than the threshold engine speed value Na.

2-3. Effect

According to the second embodiment described in detail above, the following effect is further achieved in addition to the effect of the first embodiment.

The microcomputer 3 is reset for the predetermined reset time on an additional condition that the abnormality detected by the abnormality detection unit 29 is the engine-stall possibility abnormality. Therefore, when the abnormality that has occurred in the microcomputer 3 is the non-stalling possibility abnormality, resetting of the microcomputer 3 is avoided. Therefore, it is easy to realize that the vehicle travels as much as possible even when an abnormality occurs.

In the second embodiment, the CPU 11 functions as the reset execution unit by executing the reset control process of FIG. 3. S110 to S130 and S150 in the reset control process of FIG. 3 correspond to a process as the reset execution unit. Also, S150 corresponds to processing as a possibility determination unit.

Third Embodiment

Difference from First Embodiment

Since a basic configuration of the third embodiment is similar to the first embodiment, only differences from the first embodiment will be described below. The same reference numerals and symbols as in the first embodiment denote the same structural components and operations, and reference is made to the preceding description.

Figure 4:
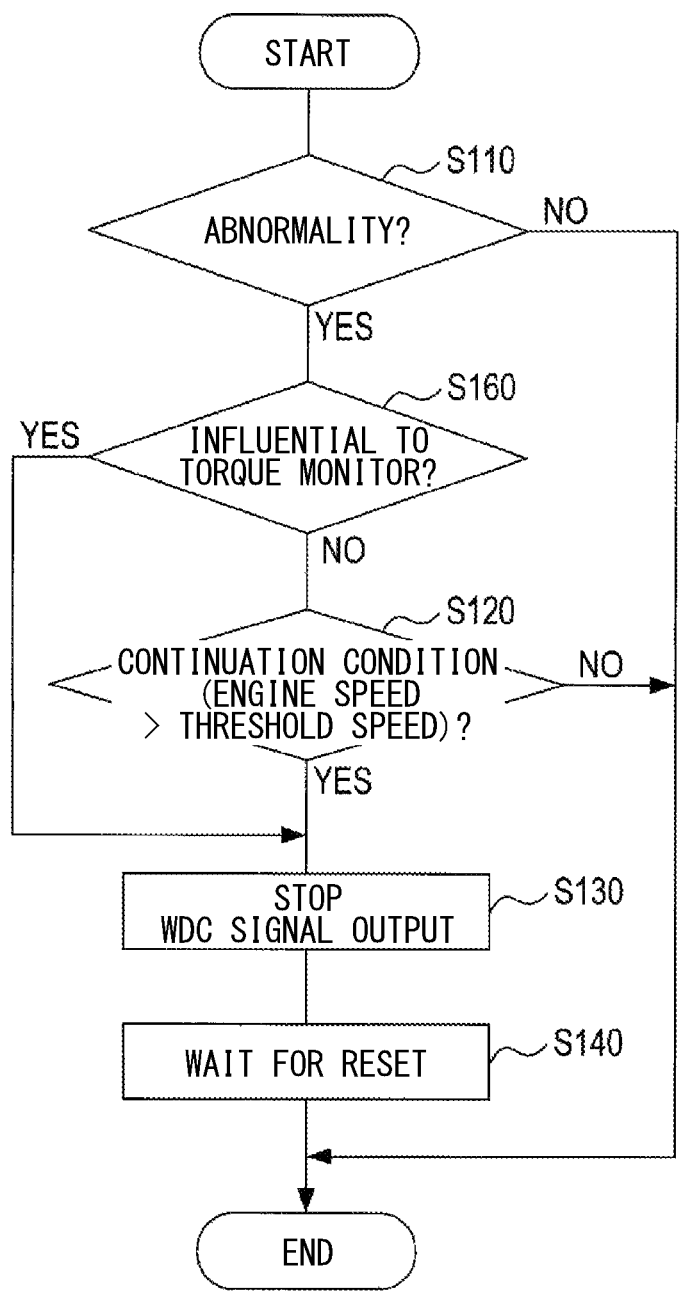
FIG. 4 is a flowchart of a reset control process executed in the third embodiment.

The ECU 1 of the third embodiment is different from that of the first embodiment in that the CPU 11 executes a reset control process of FIG. 4 instead of the reset control process of FIG. 2.

3-2. Processing

The reset control process of FIG. 4 is different from the reset control process of FIG. 2 in that S160 is added.

As shown in FIG. 4, when the CPU 11 determines in S110 that the abnormality of the microcomputer 3 has been detected by the abnormality detection unit 29, the CPU 11 determines in S160 whether the abnormality detected by the abnormality detection unit 29 is influential on a torque monitor process.

For example, of the abnormalities of the microcomputer 3, the abnormality of the cache memory 13, the abnormality of the CPU 11, and a data error in the storage area in the RAM 19 or the ROM 17 used for the torque monitor process are determined to be the abnormalities that affect the torque monitor process. On the other hand, in the present embodiment, since the high-performance timer 21 is not used for the torque monitor process, the abnormality of the high-performance timer 21 is not influential on the torque monitor process. Further, for example, the data error in a storage area in the RAM 19 or the ROM 17 that is not used for the torque monitor process is also determined as an abnormality that is not influential on the torque monitor process.

When the CPU 11 determines in S160 that the abnormality detected by the abnormality detection unit 29 is not an abnormality that influences on the torque monitor process, the CPU 11 determines in S120 whether the engine speed is larger than the threshold engine speed value Na.

When the CPU 11 determines in S160 that the abnormality detected by the abnormality detection unit 29 is an abnormality that influences on the torque monitor process, the CPU 11 skips S120 and causes in S130 the monitor IC 5 to reset the microcomputer 3.

3-3. Effect

According to the third embodiment described in detail above, the following effect is further achieved in addition to the effect of the first embodiment described above.

When the abnormality detected by the abnormality detection unit 29 is an abnormality that influences on the torque monitor process, the microcomputer 3 is reset for the predetermined reset time regardless of other conditions. Therefore, it is possible to prevent the engine control from being continued in a state where the torque monitor process executed for the functional safety may not be normally executed. Therefore, it is possible to improve the safety of engine control, and thus the safety of the vehicle.

In the third embodiment, the CPU 11 functions as a reset execution unit by executing the reset control process of FIG. 4. S110 to S130 and S160 in the reset control process of FIG. 4 correspond to a process as the reset execution unit. Also, S160 corresponds to a process as an influence determination unit.

Fourth Embodiment 4-1. Difference from Second Embodiment

Since a basic configuration of the fourth embodiment is the same as that of the second embodiment, only differences from the second embodiment will be described below. The same reference numerals and symbols as in the second embodiment denote the same structural components and operations, and reference is made to the preceding description.

Figure 5:
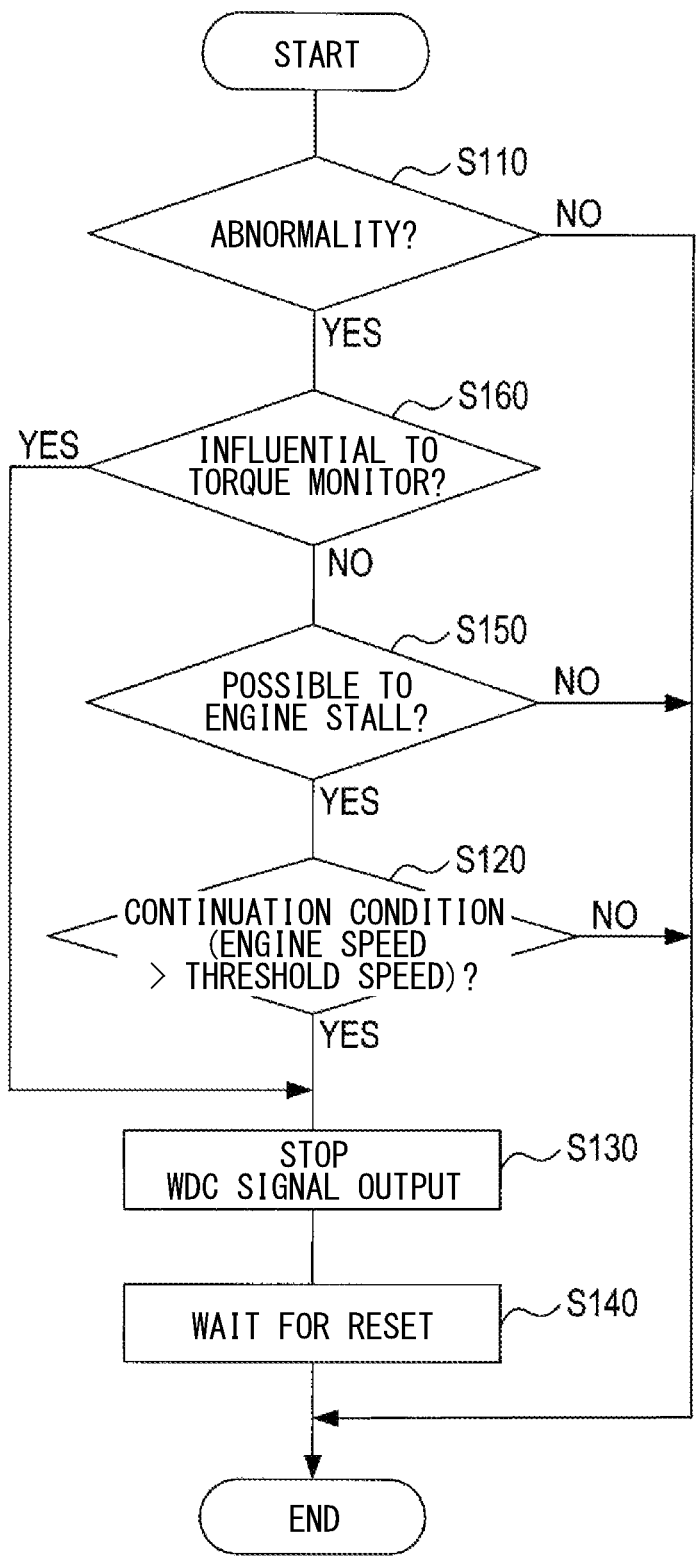
FIG. 5 is a flowchart of a reset control process executed in the fourth embodiment.

The ECU 1 of the fourth embodiment is different from that of the second embodiment in that the CPU 11 executes a reset control process of FIG. 5 instead of the reset control process of FIG. 3.

4-2. Processing

The reset control process of FIG. 5 is different from the reset control process of FIG. 3 in that S150 is added. S160 of FIG. 5 is the same as S160 of FIG. 4.

As shown in FIG. 5, when the CPU 11 determines in S110 that the abnormality of the microcomputer 3 is by the abnormality detection unit 29, the CPU 11 determines in S160 whether the abnormality detected by the abnormality detection unit 29 is influential on the torque monitor process.

When the CPU 11 determines in S160 that the abnormality detected by the abnormality detection unit 29 is not an abnormality that influences the torque monitor process, the CPU 11 determines in S150 whether there is a possibility of engine stall.

When the CPU 11 determines in S160 that the abnormality detected by the abnormality detection unit 29 is an abnormality that influences the torque monitor process, the CPU 11 skips S150 and S120 and causes the monitor IC 5 to reset the microcomputer 3.

4-3. Effect

According to the fourth embodiment described in detail above, the effect of the third embodiment described above are also provided in addition to the effect of the second embodiment described above.

In the fourth embodiment, the CPU 11 functions as the reset execution unit by executing the reset control process of FIG. 5. S110 to S130, S150 and S160 in the reset control process of FIG. 5 correspond to processes of the reset execution unit.

5. Fifth Embodiment 5-1. Difference from First Embodiment

Since a basic configuration of the fifth embodiment is the same as that of the first embodiment, only differences from the first embodiment will be described below. The same reference numerals and symbols as in the first embodiment denote the same structural components and operations, and reference is made to the preceding description.

Figure 6:
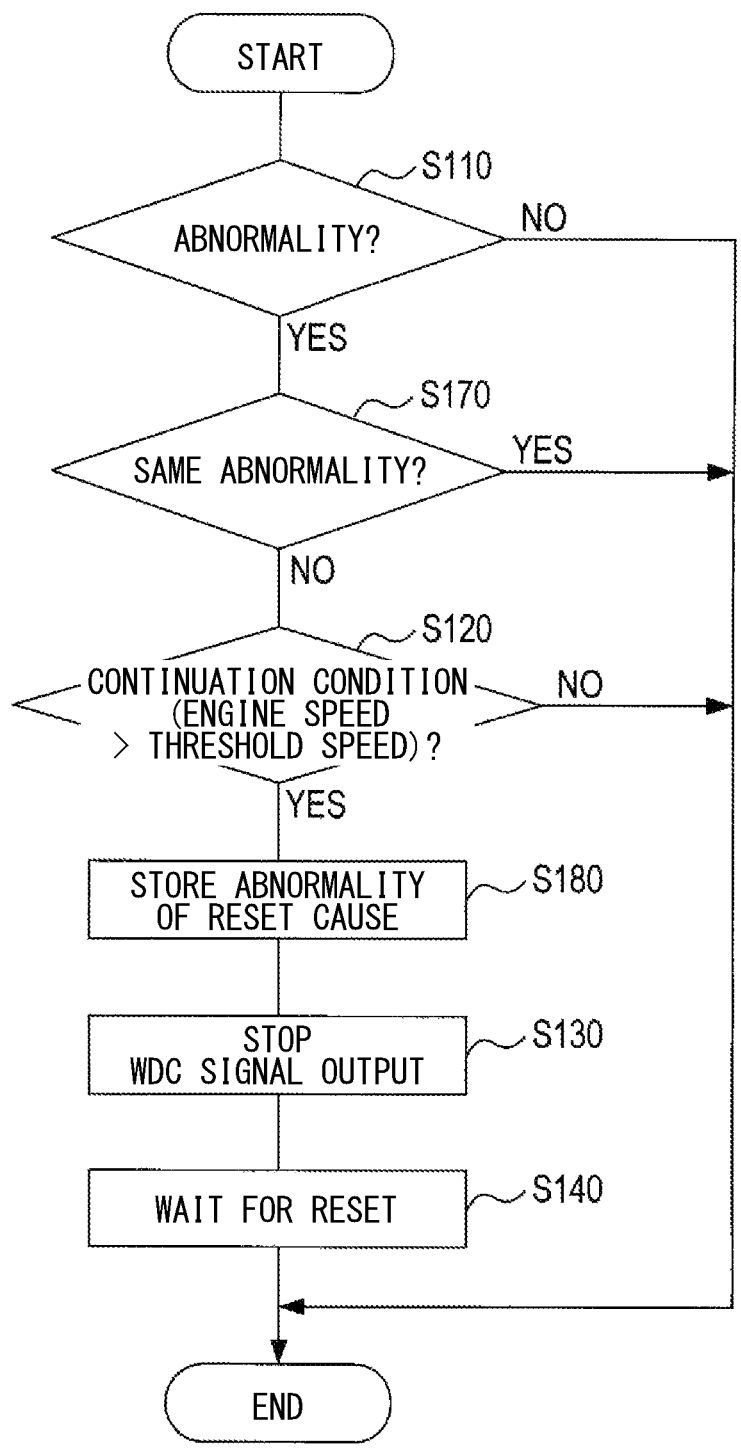
FIG. 6 is a flowchart of a reset control process executed in the fifth embodiment.

The ECU 1 of the fifth embodiment is different from that of the first embodiment in that the CPU 11 executes a reset control process of FIG. 6 instead of the reset control process of FIG. 2.

5-2. Processing

The reset control process of FIG. 6 is different from the reset control process of FIG. 2 in that S170 and S180 are added.

As shown in FIG. 6, when the CPU 11 determines in S110 that the abnormality of the microcomputer 3 has been detected by the abnormality detection unit 29, the CPU 11 executes S170.

In S170, the CPU 11 determines whether the abnormality detected by the abnormality detection unit 29 is the same abnormality as a past reset-cause abnormality, that is, the abnormality that was the cause of the resetting.

The past reset-cause abnormality is an abnormality detected by the abnormality detection unit 29 when the microcomputer 3 was reset in the past by the execution of the reset control process. Further, "past" means one time before (that is, the previous time), but may mean two or more times before. In S170, the abnormality detected by the abnormality detection unit 29 is compared with the abnormality having already been stored in S180 described later.

When the CPU 11 determines in S170 that the abnormality detected by the abnormality detection unit 29 is not the same abnormality as the abnormality that caused the reset in the past, the CPU 11 determines in S120 whether the engine speed is higher than the threshold engine speed value Na.

When the CPU 11 determines in S120 that the engine speed is higher than the threshold engine speed value Na, the CPU 11 stores in S180 the abnormality detected by the abnormality detection unit 29 as a reset-cause abnormality.

Then, in S130, the CPU 11 executes a process of stopping the output of the WDC signal to reset the microcomputer 3.

When the CPU 11 determines in S170 that the abnormality detected by the abnormality detection unit 29 is the same abnormality that has caused the resetting in the past, the CPU 11 finishes the reset control process without resetting the microcomputer 3. Therefore, in this case, the microcomputer 3 continues to control the engine.

5-3. Effect

According to the fifth embodiment described in detail above, the following effect is further achieved in addition to the effect of the first embodiment.

When the abnormality detected by the abnormality detection unit 29 is the same as the abnormality that has caused the reset of the microcomputer 3 in the past, the microcomputer 3 is not reset and the engine control is continued. Therefore, it is possible to prevent the microcomputer 3 from being reset again when the abnormality occurs in the microcomputer 3 that has not been normalized even after resetting.

In the fifth embodiment, the CPU 11 functions as the reset execution unit by executing the reset control process of FIG. 6. S110 to S130, S170 and S180 in the reset control process of FIG. 6 correspond to the processing of the reset execution unit. Further, S170 and S180 correspond to the processing of the same abnormality determination unit.

On the other hand, the CPU 11 determines in S170 whether the detected abnormality is the same as the abnormality that caused the reset in the past for a predetermined number of times of two or more consecutively. When the number of consecutive detections of the same abnormality reaches the predetermined number, the CPU 11 may skip S120 and finish the reset control process.

6. Sixth Embodiment

6-1. Difference from First Embodiment

Since a basic configuration of the sixth embodiment is the same as that of the first embodiment, only differences from the first embodiment will be described below. The same reference numerals and symbols as in the first embodiment denote the same structural components and operations, and reference is made to the preceding description.

Figure 7:
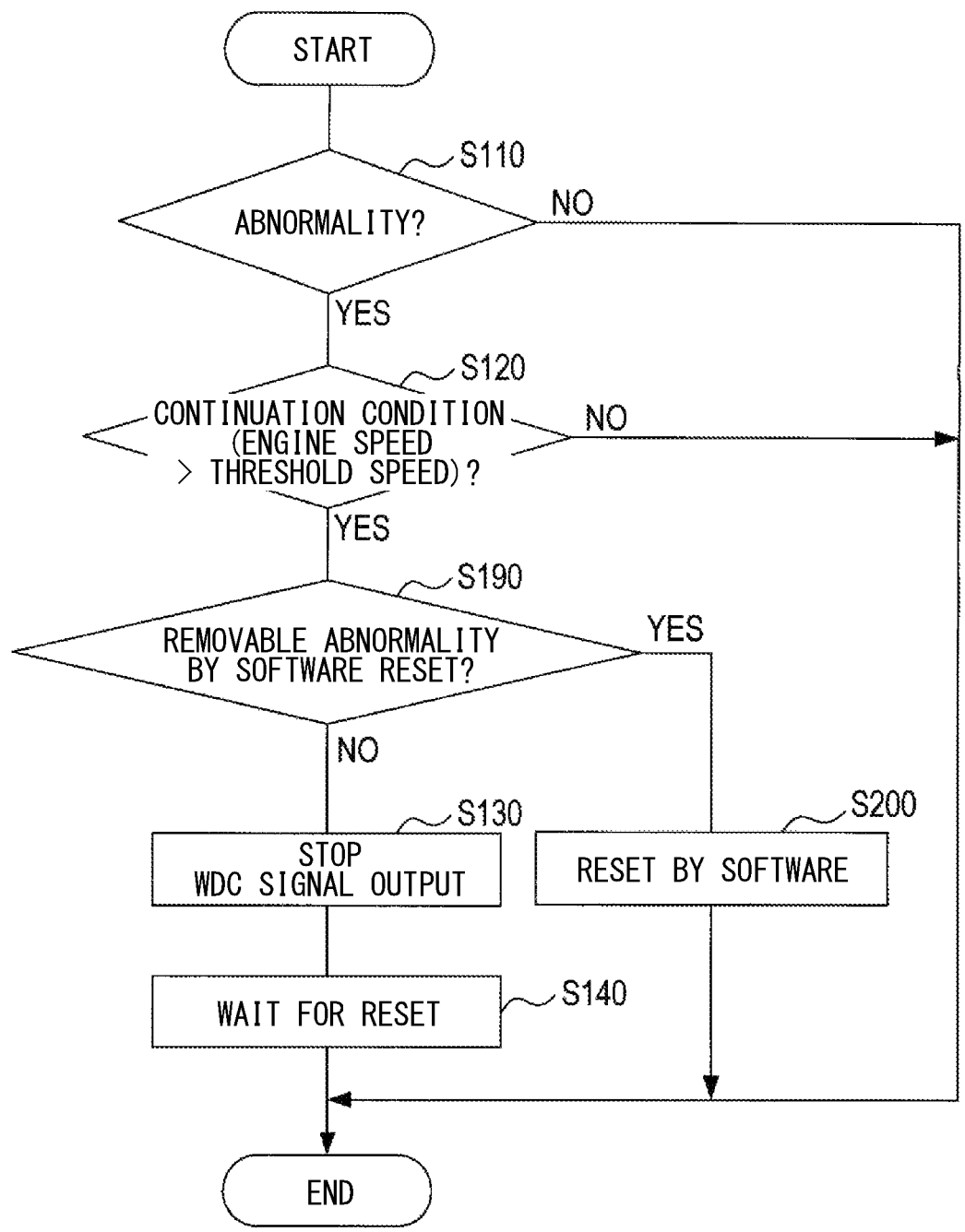
FIG. 7 is a flowchart of a reset control process executed in the sixth embodiment.

The ECU 1 of the sixth embodiment is different from that of the first embodiment in that the CPU 11 executes a reset control process of FIG. 7 instead of the reset control process of FIG. 2.

6-2. Processing

The reset control process of FIG. 7 is different from the reset control process of FIG. 2 in that S190 and S200 are added.

As shown in FIG. 7, when the CPU 11 determines in S120 that the engine speed is higher than the threshold engine speed value Na, the CPU 11 executes S190. In S190, the CPU 11 determines whether the abnormality detected by the abnormality detection unit 29 is an abnormality that is removable, that is, can be resolved, by a software reset of the microcomputer 3. The software reset means a reset that restarts software processing from the same start address (that is, start-up address) as when the power is turned on for microcomputer activation, without an application of an external reset signal. That is, it means that an execution destination address of the program is moved to the startup address.

When the program is executed from the start address, an initialization process for initializing the RAM 19, the high-performance timer 21, the general-purpose timer 23, the communication processing unit 27, and the like is executed. That is, the CPU 11 executes the initialization process by returning to the address at the time of activation and brings one or more pieces of hardware in the microcomputer 3 into a state, which is present immediately after the activation of the microcomputer (that is, an initial state). Therefore, in S190, the CPU 11 determines whether the abnormality detected by the abnormality detection unit 29 is the abnormality that can be initialized by the above initialization processing. In case the abnormality can be initialized, it may be determined that the abnormality can be removable by the software reset.

When the CPU 11 determines in S190 that the abnormality detected by the abnormality detection unit 29 is an abnormality that can be removed by the software reset, the CPU 11 executes the software reset of the microcomputer 3 in S200.

When the CPU 11 determines in S190 that the abnormality detected by the abnormality detection unit 29 is not an abnormality that can be removed by the software reset, the CPU 11 stops outputting the WDC signal in S130 so that the microcomputer 3 may be reset by hardware. The hardware reset means a reset by a reset signal from the outside of the microcomputer 3 (that is, the monitoring IC 5).

6-3. Effect

According to the sixth embodiment described in detail above, the following effect is further provided in addition to the effect of the first embodiment.

When the abnormality of the microcomputer 3 has been detected and the engine speed is determined to be higher than the threshold engine speed value Na in S120, and the detected abnormality is determined in S190 to be the abnormality that can be removed by software reset, the software reset is executed. Further, when the abnormality of the microcomputer 3 has been detected and the engine speed is determined to be greater than the threshold engine speed value Na in S120, and the detected abnormality is determined in S190 to be not removable by the software reset, the hardware reset is executed. Therefore, it is possible to execute different resets according to the contents of the abnormality that has occurred.

In the sixth embodiment, the CPU 11 functions as the reset execution unit by executing the reset control process of FIG. 7. S110 to S130, S190 and S200 in the reset control process of FIG. 7 are processing executed as the reset execution unit. Further, S190 corresponds to processing as the abnormality determination unit.

7. Seventh Embodiment

7-1. Difference from First Embodiment

Since a basic configuration of the seventh embodiment is the same as that of the first embodiment, only differences from the first embodiment will be described below. The same reference numerals and symbols as in the first embodiment denote the same structural components and operations, and reference is made to the preceding description.

Figure 8:
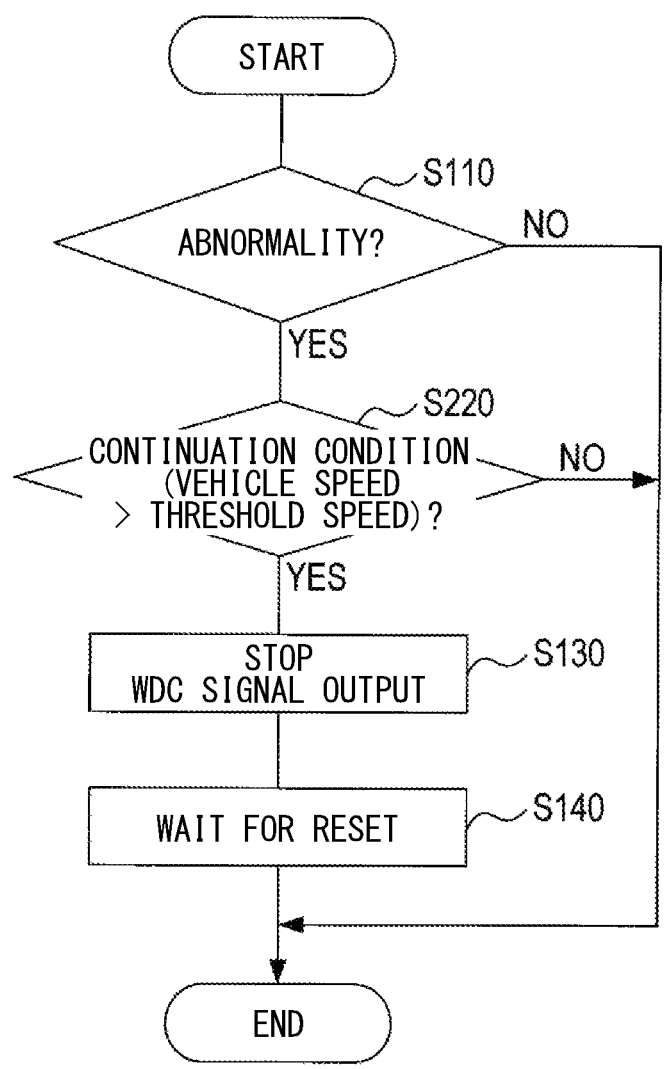
FIG. 8 is a flowchart of a reset control process executed in the seventh embodiment.

The ECU 1 of the seventh embodiment is different from that of the first embodiment in that the CPU 11 executes a reset control process of FIG. 8 instead of the reset control process of FIG. 2.

7-2. Processing

The reset control process of FIG. 8 is different from the reset control process of FIG. 2 in that S220 are provided instead of S120.

As shown in FIG. 8, when the CPU 11 determines in S110 that the abnormality of the microcomputer 3 is detected in S110, the CPU 11 determines in S220 whether a vehicle speed is higher than a predetermined threshold vehicle speed value Va.

The vehicle speed may be calculated, for example, based on a time interval of a pulse signal output from a vehicle speed sensor (not shown), or may be calculated from an amount of change in the vehicle position detected based on the GPS signal per unit time.

The predetermined threshold vehicle speed value Va is set to a value equal to or higher than a minimum value of the vehicle speed, for example, which enables the microcomputer 3 to restart the engine control while the vehicle is still movable by inertial. The threshold engine speed value Va may be set based on an experiment or may be set based on a design calculation.

It is thus possible to enable the vehicle to continue to run by restarting the engine control while the vehicle is movable by inertia, even when the microcomputer 3 is reset. In this embodiment, the condition determined in S220, that is, the condition that the vehicle speed is higher than the predetermined threshold vehicle speed value Va corresponds to the continuation condition.

When the CPU 11 determines in S220 that the vehicle speed is not higher than the predetermined threshold vehicle speed value Va, the CPU 11 finishes the reset control process.

When the CPU 11 determines in S220 that the vehicle speed is higher than the predetermined threshold value Va, the CPU 11 stops in S130 outputting the WDC signal to the monitor IC 5 as a process for resetting the microcomputer 3.

7-3. Effect

According to the seventh embodiment described in detail above, like the other embodiments, the microcomputer 3 can be restarted and the engine control can be restarted while the vehicle can still continue traveling, even when the microcomputer 3 is reset.

Specifically, the microcomputer 3 is reset for the predetermined reset time on condition that the abnormality of the microcomputer 3 has been detected and the vehicle speed is higher than the predetermined threshold vehicle speed value Va. Therefore, when an abnormality occurs in the microcomputer 3, the microcomputer 3 can be reset for normalization under the condition that the vehicle speed is higher than the predetermined vehicle speed value Va. Therefore, even when the microcomputer 3 is reset and the engine control is stopped, the microcomputer 3 can be restarted and the engine control can be restarted while the vehicle can continue to run by inertia. Therefore, it is easy to continue traveling of the vehicle as much as possible even when an abnormality occurs.

In the seventh embodiment, the CPU 11 functions as the reset execution unit by executing the reset control process of FIG. 8. S110, S130 and S220 in the reset control process of FIG. 8 are processing executed by the reset execution unit. Further, S220 corresponds to a process as a condition determination unit that determines whether the continuation condition is satisfied, and also corresponds to a process as the vehicle speed determination unit described above.

8. Eighth Embodiment

8-1. Difference from Second Embodiment

Since a basic configuration of the eighth embodiment is the same as that of the second embodiment, only differences from the second embodiment will be described below. The same reference numerals and symbols as in the second embodiment denote the same structural components and operations, and reference is made to the preceding description.

Figure 9:
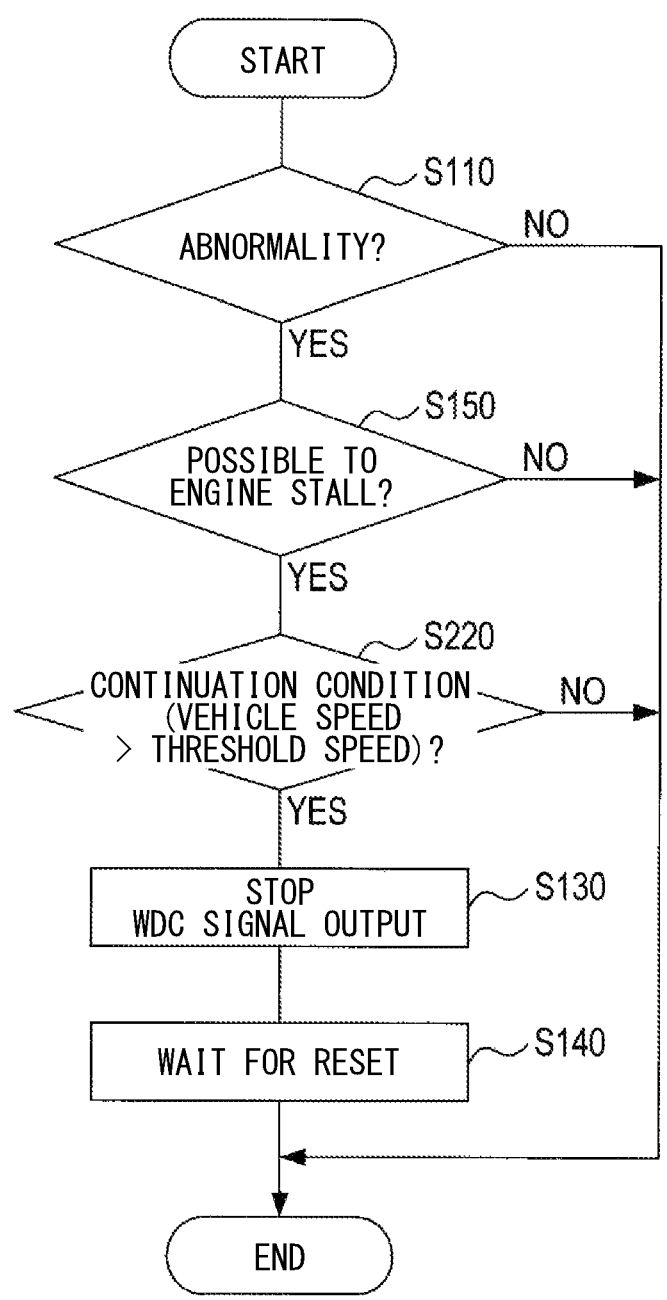
FIG. 9 is a flowchart of a reset control process executed in the eighth embodiment.

The ECU 1 of the eighth embodiment is different from that of the second embodiment in that the CPU 11 executes a reset control process of FIG. 9 instead of the reset control process of FIG. 3.

8-2. Processing

The reset control process of FIG. 9 is different from the reset control process of FIG. 3 in that S220 is executed as in FIG. 8 instead of S120.

8-3. Effect

According to the eighth embodiment, not only the same effect as that of the above-described seventh embodiment is achieved but also the same effect as that of the second embodiment is achieved.

In the eighth embodiment, the CPU 11 functions as the reset execution unit by executing the reset control process of FIG. 9. S110, S130, S150 and S220 in the reset control process of FIG. 9 correspond to the processing of the reset execution unit.

9. Ninth Embodiment

9-1. Difference from Third Embodiment

Since a basic configuration of the ninth embodiment is the same as that of the third embodiment, only differences from the third embodiment will be described below. The same reference numerals and symbols as in the third embodiment denote the same structural components and operations, and reference is made to the preceding description.

Figure 10:
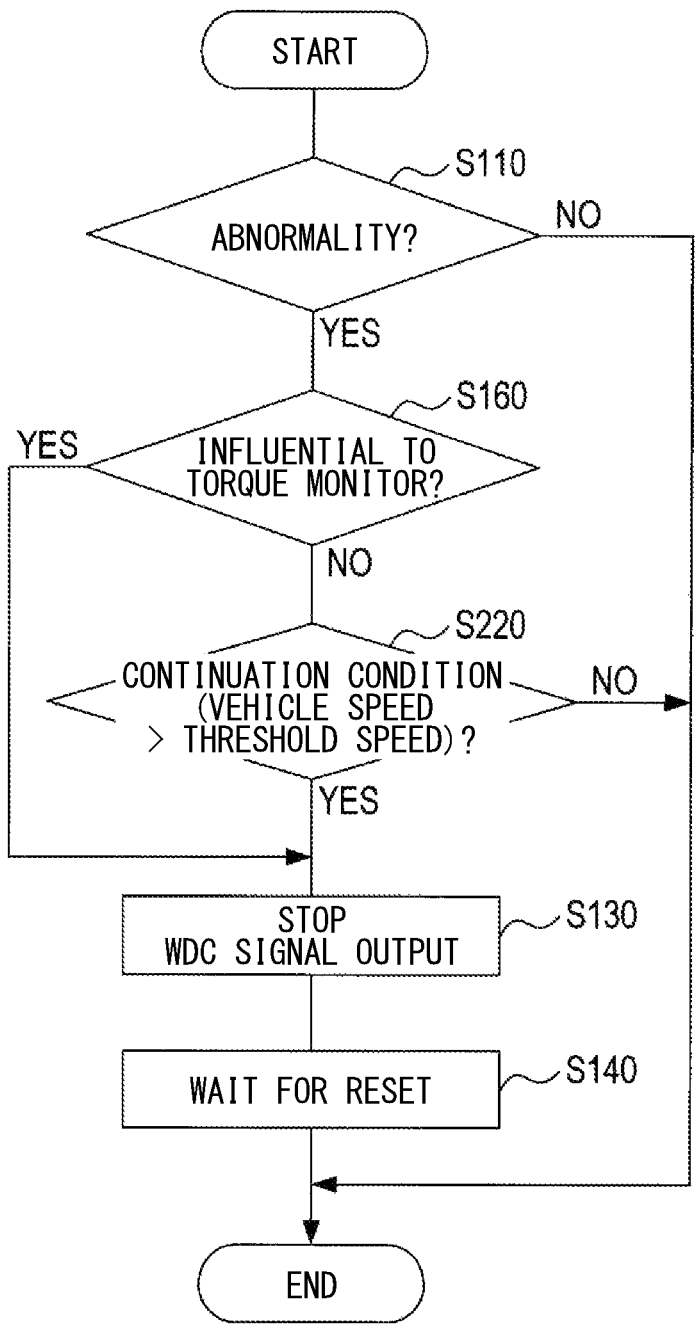
FIG. 10 is a flowchart of a reset control process executed in the ninth embodiment.

The ECU 1 of the ninth embodiment is different from that of the third embodiment in that the CPU 11 executes a reset control process of FIG. 10 instead of the reset control process of FIG. 4.

9-2. Processing

The reset control process of FIG. 10 differs from the reset control process of FIG. 4 in that the same S220 as in FIG. 8 is provided instead of S120.

9-3. Effect

According to the ninth embodiment, not only the same effect as that of the above-described seventh embodiment is achieved but also the same effect as that of the third embodiment is achieved.

In the ninth embodiment, the CPU 11 functions as the reset execution unit by executing the reset control process of FIG. 10. S110, S130, S160 and S220 in the reset control process of FIG. 10 correspond to the processing of the reset execution unit.

10. Tenth Embodiment

10-1. Difference from Fourth Embodiment

Since a basic configuration of the tenth embodiment is the same as that of the fourth embodiment, only differences from the fourth embodiment will be described below. The same reference numerals and symbols as in the fourth embodiment denote the same structural components and operations, and reference is made to the preceding description.

Figure 11:
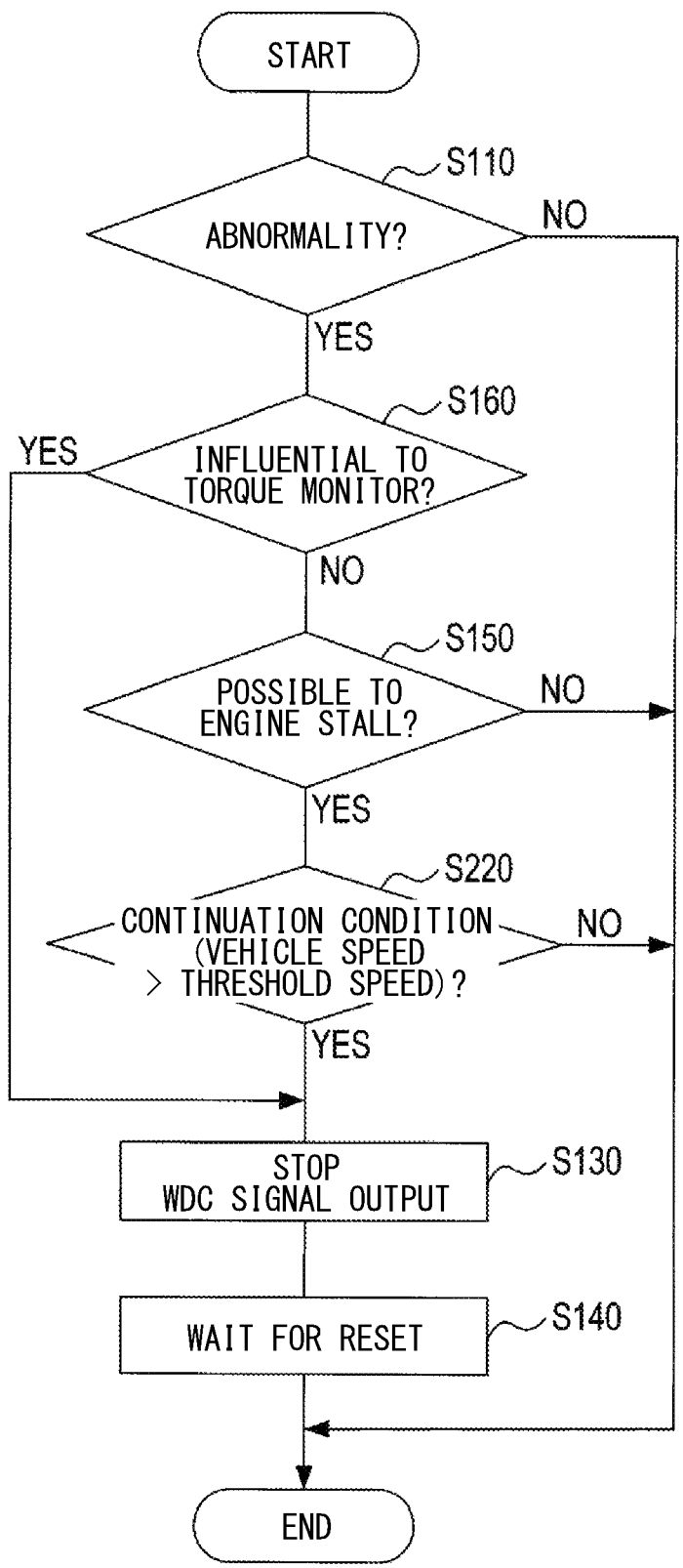
FIG. 11 is a flowchart of a reset control process executed in the tenth embodiment.

The ECU 1 of the tenth embodiment is different from that of the third embodiment in that the CPU 11 executes a reset control process of FIG. 11 instead of the reset control process of FIG. 5.

10-2. Processing

The reset control process of FIG. 11 differs from the reset control process of FIG. 5 in that the same S220 as in FIG. 8 is provided instead of S120.

10-3. Effect

According to the tenth embodiment, the effect of the seventh embodiment described above is achieved, and further the effect described in the second embodiment and the third embodiment is achieved.

In the tenth embodiment, the CPU 11 functions as the reset execution unit by executing the reset control process of FIG. 11. S110, S130, S150, S160 and S220 in the reset control process of FIG. 11 are processing executed by the reset execution unit.

11. Eleventh Embodiment

11-1. Difference from Fifth Embodiment

Since a basic configuration of the eleventh embodiment is the same as that of the fifth embodiment, only differences from the fifth embodiment will be described below. The same reference numerals and symbols as in the fifth embodiment denote the same structural components and operations, and reference is made to the preceding description.

Figure 12:
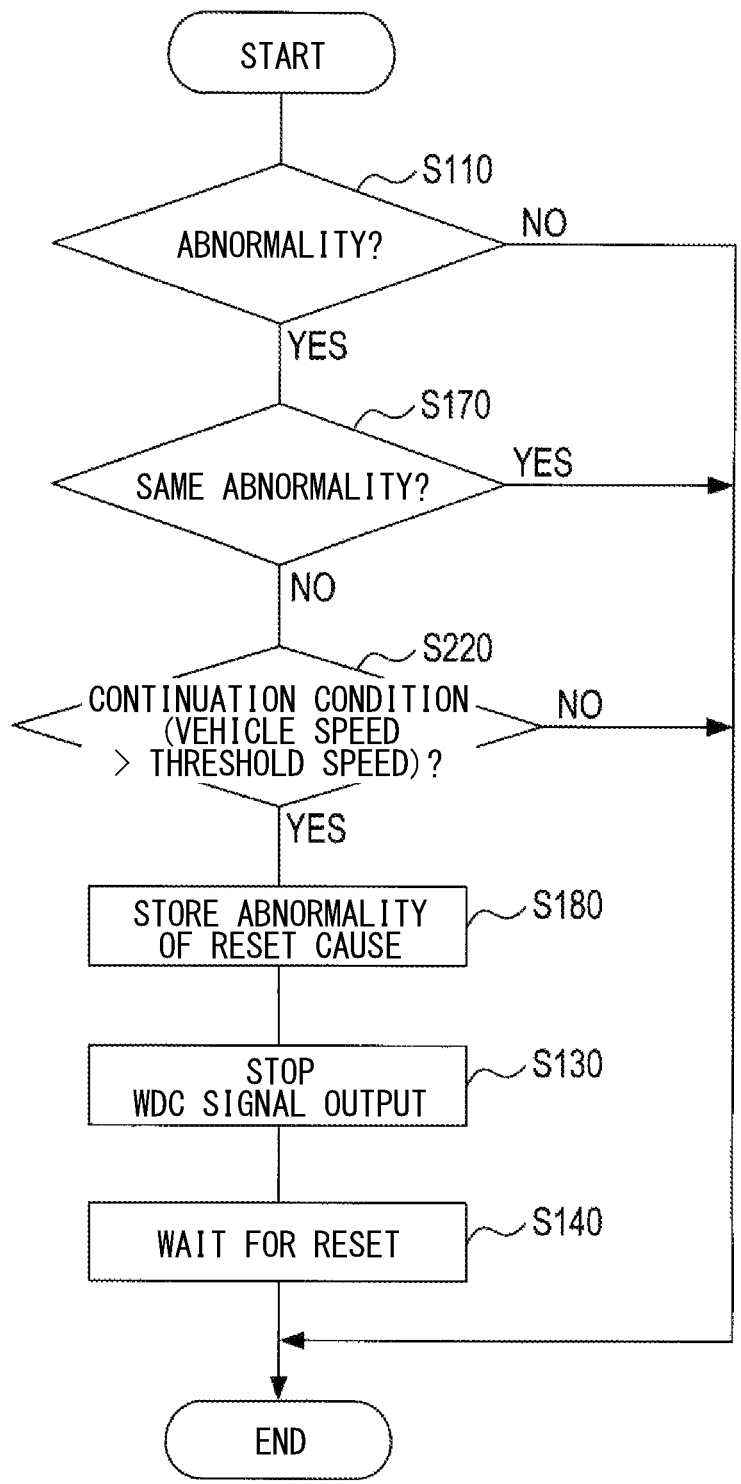
FIG. 12 is a flowchart of a reset control process executed in the eleventh embodiment.

The ECU 1 of the eleventh embodiment is different from that of the fifth embodiment in that the CPU 11 executes a reset control process of FIG. 12 instead of the reset control process of FIG. 6.

11-2. Processing

The reset control process of FIG. 12 differs from the reset control process of FIG. 6 in that the same S220 as in FIG. 8 is provided instead of S120.

11-3. Effect

According to the eleventh embodiment, not only the same effect as that of the above-described seventh embodiment is achieved but also the same effect as that of the fifth embodiment is achieved.

In the eleventh embodiment, the CPU 11 functions as the reset execution unit by executing the reset control process of FIG. 12. S110, S130, S170, S180 and S220 in the reset control process of FIG. 12 are processing executed by the reset execution unit.

12. Twelfth Embodiment

12-1. Difference from Sixth Embodiment

Since a basic configuration of the twelfth embodiment is the same as that of the sixth embodiment, only differences from the sixth embodiment will be described below. The same reference numerals and symbols as in the sixth embodiment denote the same structural components and operations, and reference is made to the preceding description.

Figure 13:
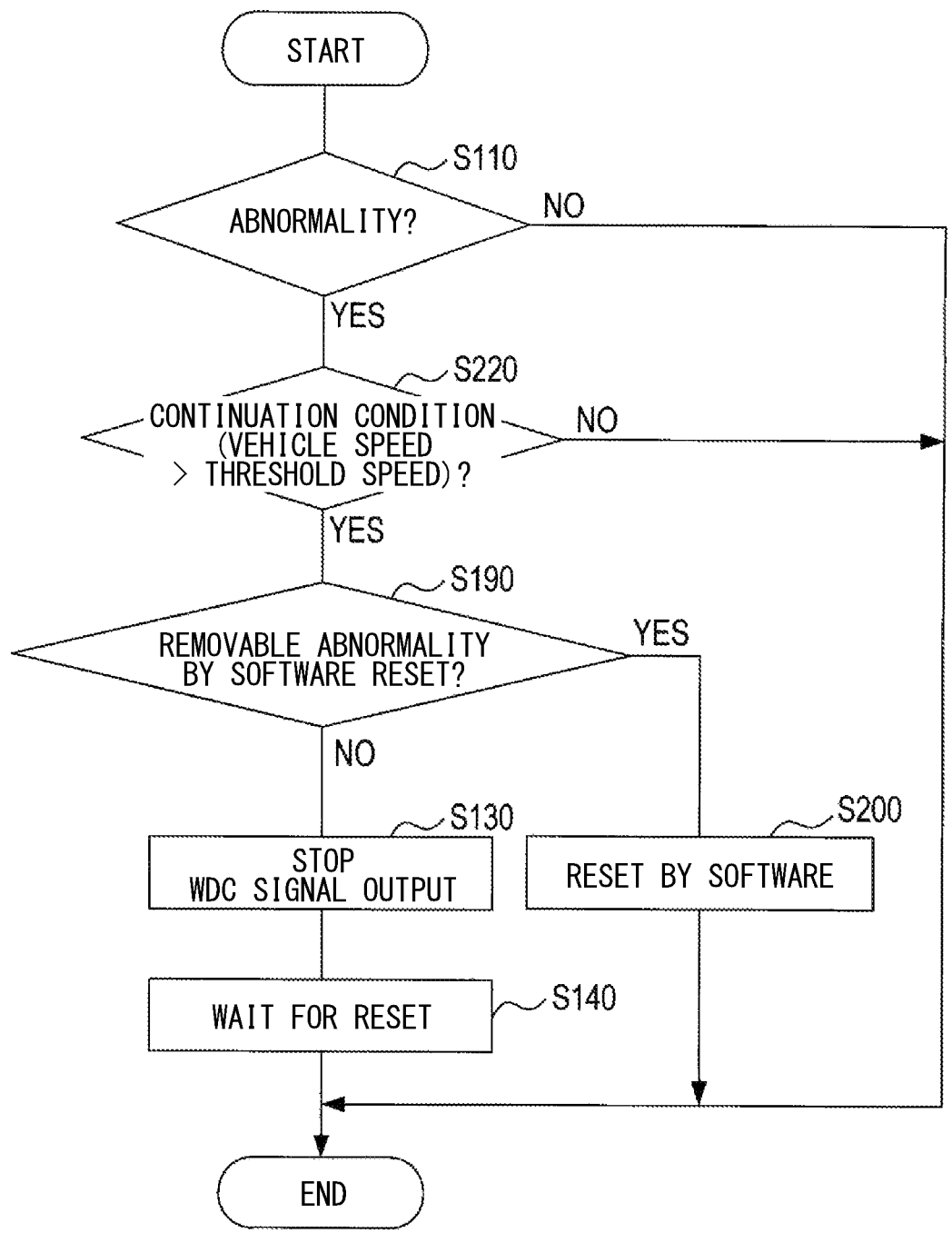
FIG. 13 is a flowchart of a reset control process executed in the twelfth embodiment.

The ECU 1 of the twelfth embodiment is different from that of the sixth embodiment in that the CPU 11 executes a reset control process of FIG. 13 instead of the reset control process of FIG. 7.

12-2. Processing

The reset control process of FIG. 13 differs from the reset control process of FIG. 7 in that the same S220 as in FIG. 8 is provided instead of S120.

12-3. Effect

According to the twelfth embodiment, the effect of the above-described seventh embodiment is achieved, and further it is possible to execute the reset similarly to the sixth embodiment in correspondence to the content of the abnormality that has occurred.

In the twelfth embodiment, the CPU 11 functions as the reset execution unit by executing the reset control process of FIG. 13. S110, S130, S190, S200 and S220 in the reset control process of FIG. 13 are processing executed by the reset execution unit.

13. Thirteenth Embodiment

13-1. Difference from First Embodiment

Since a basic configuration of the thirteenth embodiment is the same as that of the first embodiment, only differences from the first embodiment will be described below. The same reference numerals and symbols as in the first embodiment denote the same structural components and operations, and reference is made to the preceding description.

13-2. Configuration

Figure 14:
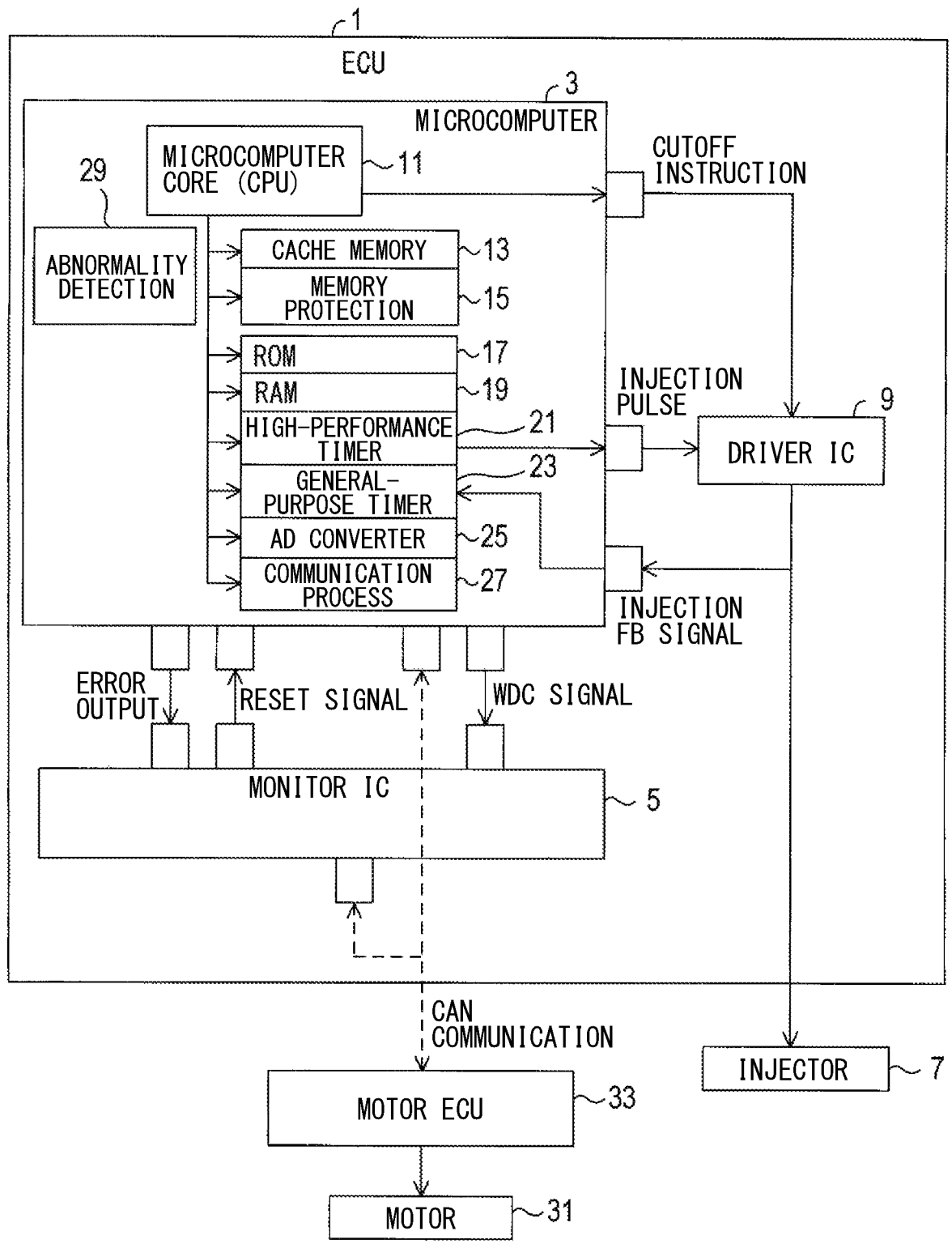
FIG. 14 is a block diagram showing a configuration of an engine control device according to the thirteenth embodiment.

The ECU 1 of the thirteenth embodiment shown in FIG. 14 is mounted on a vehicle equipped with an engine and a motor 31 as vehicle drive power sources for traveling. The hardware is different from the first embodiment in the following points <D1> to <D3>.

<D1> A signal (hereinafter referred to as an error output) indicating that an abnormality has been detected is transmitted from the microcomputer 3 to the monitor IC 5. The error output is, for example, a high or low level signal. The error output becomes an active level (for example, high level) which is one of high and low levels, when the microcomputer 3 detects an abnormality. In the following description, turning on the error output (error output: on) means that the error output is at the active level.

<D2> As shown by a dotted line in FIG. 14, the microcomputer 3 is configured to be able to communicate with a motor ECU 33 different from the ECU 1. The motor ECU 33 is one of the ECUs mounted on the vehicle. The motor ECU 33 controls the motor 31 provided as a vehicle drive power source different from the engine in the vehicle.

The communication protocol between the microcomputer 3 and the motor ECU 33 is CAN, for example. The protocol may be other than CAN.

<D3> As shown by the dotted line in FIG. 14, the monitor IC 5 is configured to be able to communicate with the motor ECU 33.

The communication protocol between the monitor IC 5 and the motor ECU 33 is CAN, for example. The protocol may be other than CAN.

13-3. Processing

Figure 15:
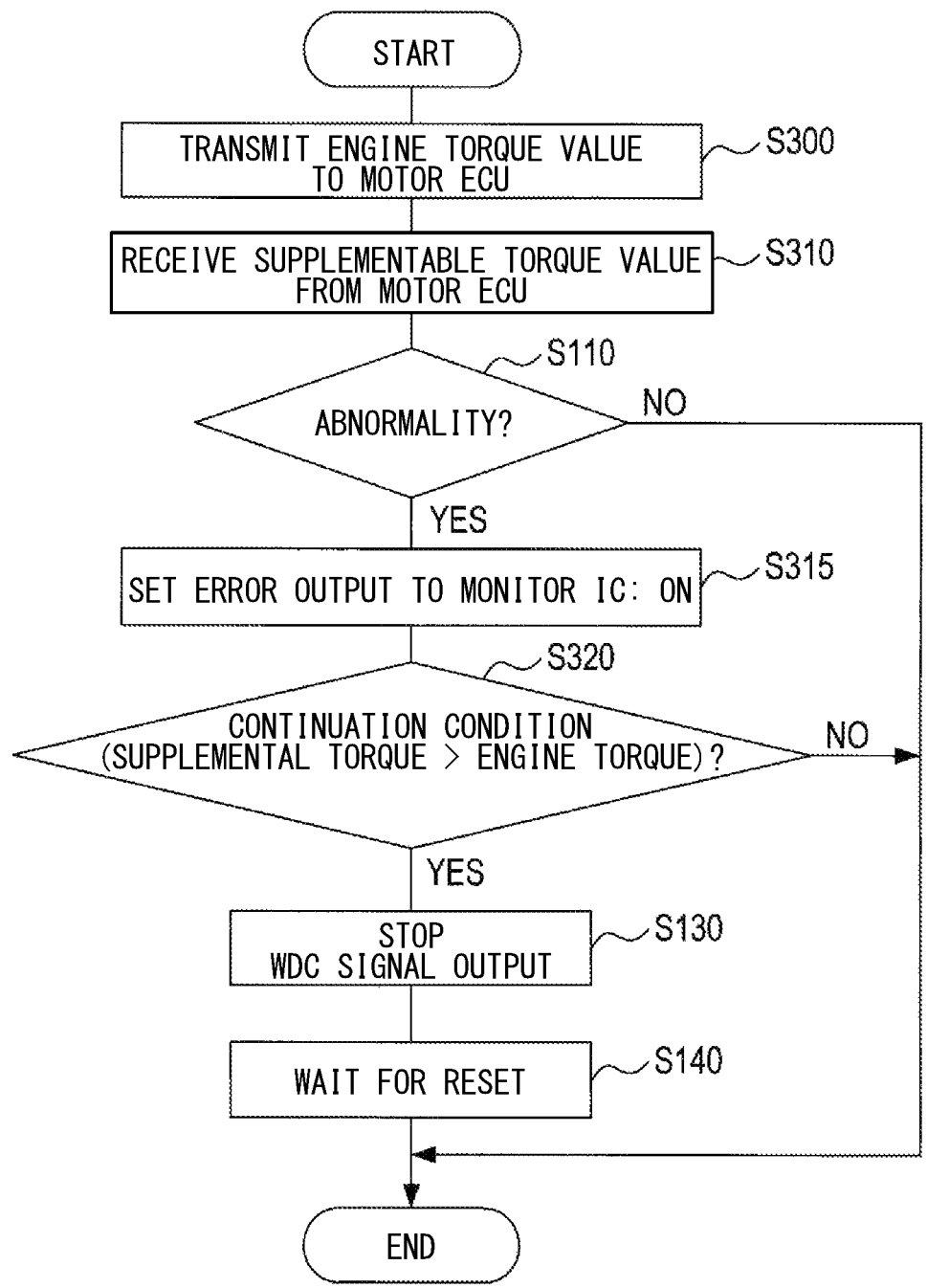
FIG. 15 is a flowchart of a reset control process executed in the thirteenth embodiment.

The ECU 1 of the thirteenth embodiment is different from that of the first embodiment in that the CPU 11 executes a reset control process of FIG. 15 instead of the reset control process of FIG. 2. The monitor IC 5 executes the processing shown in FIG. 16. Further, the motor ECU 33 executes the process shown in FIG. 17, for example, at regular intervals. It is noted that the process of FIG. 17 is executed by a microcomputer provided in the motor ECU 33, for example. The process of FIG. 17 may be executed by a microcomputer provided in the motor ECU 33.

13-3-1. Reset Control Process

As shown in FIG. 15, the CPU 11 transmits in S300 an engine torque value to the motor ECU 33 by CAN communication. The engine torque value here is a value of the torque that the ECU 1 outputs to the engine to be generated by the engine. The engine torque value transmitted to the motor ECU 33 may be, for example, a target torque value described above or a value of actual torque generated by the engine.

In next step S310, the CPU 11 receives a supplementable torque value sent from the motor ECU 33 by CAN communication.

The supplementable torque value is a supplemental torque value, which is a value of running torque of the vehicle (that is, drive system torque) that can be additionally output by the motor 31 for compensation of torque. In the present embodiment, the output torque of the motor 31 is used to compensate the output torque of the engine, which is the running torque of the vehicle and is lost by the reset of the microcomputer 3. Therefore, the supplemental torque value is a value indicating how much the output torque of the engine lost by the reset of the microcomputer 3 can be compensated by the motor 31.

In the next S110, the CPU 11 determines whether the abnormality detection unit 29 has detected an abnormality of the microcomputer 3 as in the other embodiments described above. When no abnormality has been detected, the reset control process is finished.

When the CPU 11 determines in S110 that the abnormality of the microcomputer 3 has been detected, the CPU 11 turns on the error output to the monitor IC 5 in S315. That is, the error output is set to the active level.

Then, the CPU 11 determines in S320 whether the supplemental torque value is larger than the engine torque value.

The fact that the supplemental torque value is larger than the engine torque value means that the motor 31 can compensate all of the torque output generated by the engine. Therefore, in S320, it is determined whether a condition that all the torque output of the engine can be compensated by the motor 31 is satisfied as the continuation condition.

When the CPU 11 determines in S320 that the supplemental torque value is not larger than the engine torque value, the CPU 11 finishes the reset control process.

When the CPU 11 determines in S320 that the supplemental torque value is larger than the engine torque value, the CPU 11 stops in S130 outputting the WDC signal to the monitor IC 5 as a process for resetting the microcomputer 3. Then, in the next S140, it waits until the microcomputer 3 is reset by the reset signal from the monitor IC 5.

It is noted that the CPU 11 may determine in S320 whether the supplemental torque value is equal to or larger than the engine torque value.

13-3-2. Processing of Monitor IC

Figure 16:
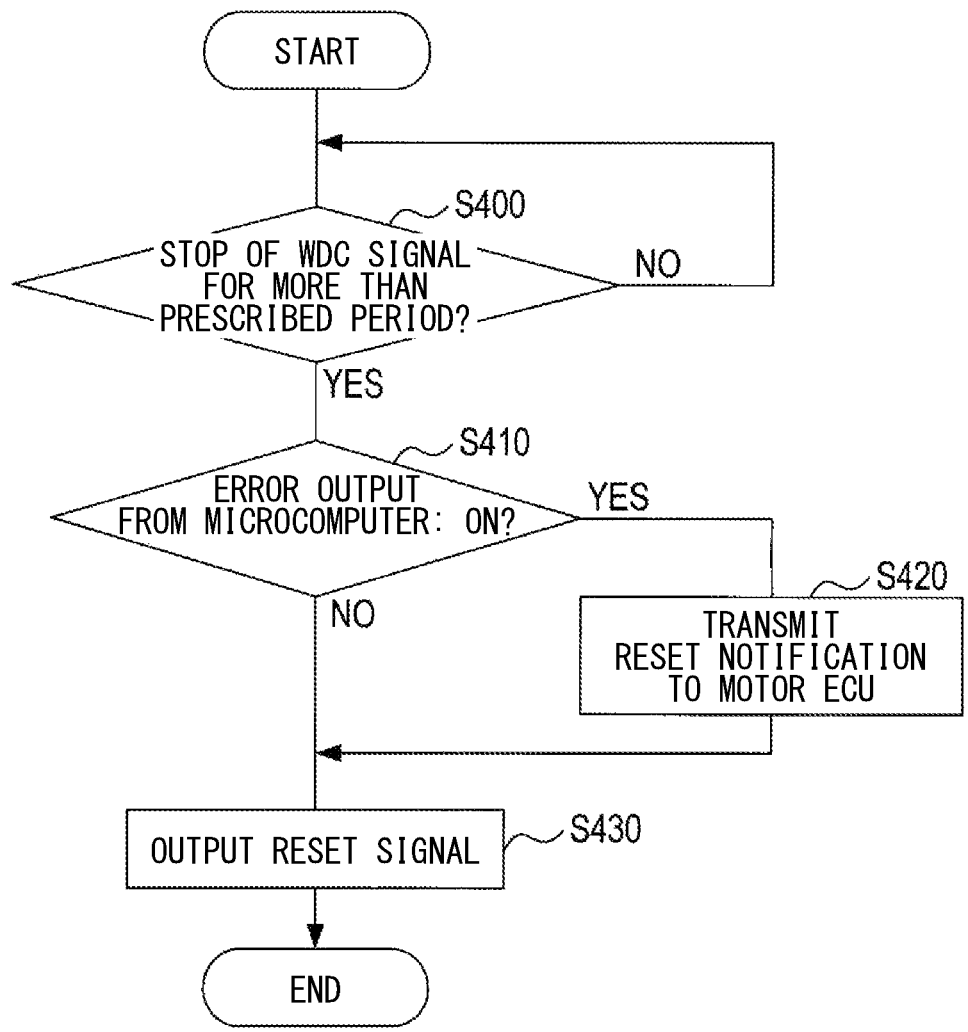
FIG. 16 is a flowchart of a process executed by a monitor IC in the thirteenth embodiment.
Figure 17:
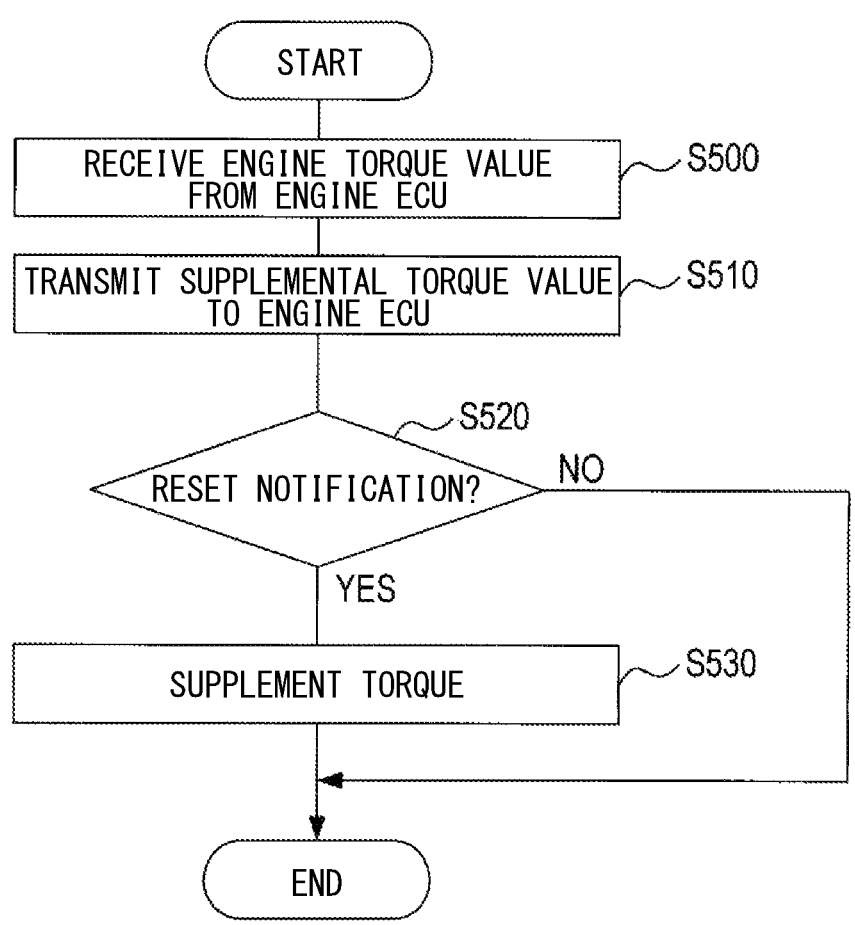
FIG. 17 is a flowchart of a process executed by a motor ECU in the thirteenth embodiment.

As shown in FIG. 16, the monitor IC 5 determines in S400 whether the output stop time of the WDC signal from the microcomputer 3 is equal to or longer than a specified time Tb. When the monitor IC 5 determines that the output stop time of the WDC signal has become the specified time Tb or more, it determines that the output of the WDC signal has stopped and executes S410.

In S410, the monitor IC 5 determines whether the error output from the microcomputer 3 is ON (that is, the active level). When the error output is ON, S420 is executed. The error output is turned on in S315 of FIG. 15. Then, the monitor IC 5 transmits a reset notification by CAN communication to the motor ECU 33 in S420, and then executes S430. The reset notification indicates that the microcomputer 3 of the ECU 1 is reset.

When the monitor IC 5 determines in S410 that the error output is not ON, S430 is executed without execution of S420.

Then, in S430, the monitor IC 5 outputs the reset signal to the reset terminal of the microcomputer 3 for the predetermined reset time.

13-3-3. Processing Executed by Motor ECU

As shown in FIG. 17, the motor ECU 33 receives in S500 the above-described engine torque value sent from the ECU 1 by CAN communication.

In next step S510, the motor ECU 33 transmits the above-described supplemental torque value to the engine ECU 1 by CAN communication.

For example, the motor ECU 33 may calculate the supplemental torque as a value that can be output as the vehicle drive torque among torque output margin values that are the difference between a predetermined maximum output torque of the motor 31 and the present output torque of the motor 31. If all the additional output torque of the motor 31 is used as the vehicle drive torque for traveling, the torque output margin value may be calculated as the supplemental torque value.

In next S520, the motor ECU 33 determines whether the reset notification gas been received. When it is determined that the reset notification has not been received, the process of FIG. 17 is finished. When it is determined that the reset notification has been received, S530 is executed.

Then, in S530, motor ECU 33 increases the output torque of the motor 31 so that the vehicle drive torque increases by the engine torque value received in S500. That is, the output torque of the engine as the vehicle drive torque lost by the reset of the microcomputer 3 is compensated by the output torque of the motor 31. After that, the motor ECU 33 finishes the process of FIG. 17.

13-4. Effect

According to the thirteenth embodiment described in detail above, like the other embodiments, the microcomputer 3 can be restarted and the engine control can be restarted while the vehicle can continue traveling even when the microcomputer 3 is reset.

Specifically, the microcomputer 3 is reset for the predetermined reset time on condition that the abnormality of the microcomputer 3 has been detected and the motor 31 can compensate for all the torque output by the engine. The motor 31 corresponds to a vehicle drive power source other than the engine. Therefore, when the abnormality occurs in the microcomputer 3, the microcomputer 3 can be reset for normalization under the condition that the entire torque output by the engine can be supplemented by another drive power source. Therefore, even when the microcomputer 3 is reset and the engine control is stopped, the microcomputer 3 can be restarted and engine control can be restarted while the torque output from the engine is being compensated by another drive power source. Therefore, it is easy to continue traveling of the vehicle as much as possible even when an abnormality occurs.

It is to be noted that, in S320, whether the supplemental torque value is larger than a predetermined ratio of the engine torque value, that is, whether the predetermined ratio (that is, a part) of the torque output by the engine can be supplied by the motor 31. The predetermined ratio may be set to a value that enables the vehicle to continue traveling. In this case, the microcomputer 3 is reset on condition that a part of the torque output by the engine can be compensated by another drive power source. Further, in terms of preventing the running performance of the vehicle from being impaired, it is preferable that all of the drive torque output by the engine be compensated.

In the thirteenth embodiment, the CPU 11 functions as the reset execution unit by executing the reset control process of FIG. 15. S110, S130 and S320 in the reset control process of FIG. 15 are processing executed by the reset execution unit. Further, S320 corresponds to a process as a condition determination unit that determines whether the continuation condition is satisfied, and also corresponds to a process as a supplement possibility determination unit.

14. Fourteenth Embodiment

14-1. Difference from Thirteenth Embodiment

Since a basic configuration of the thirteenth embodiment is the same as that of the thirteenth embodiment, only differences from the thirteenth embodiment will be described below. The same reference numerals and symbols as in the thirteenth embodiment denote the same structural components and operations, and reference is made to the preceding description.

Figure 18:
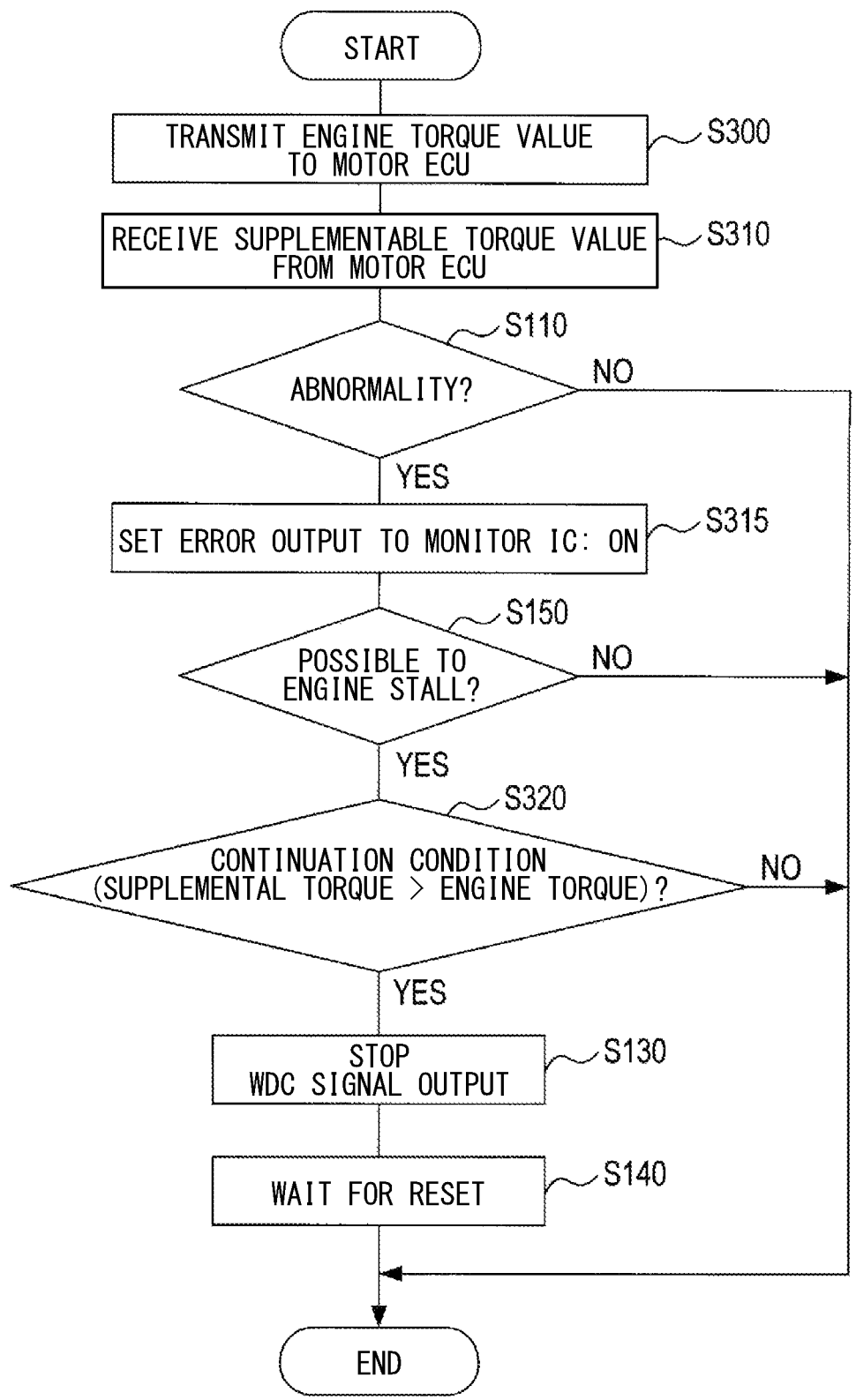
FIG. 18 is a flowchart of a reset control process executed in the fourteenth embodiment.

The ECU 1 of the fourteenth embodiment is different from that of the thirteenth embodiment in that the CPU 11 executes a reset control process of FIG. 18 instead of the reset control process of FIG. 15.

14-2. Processing

The reset control process of FIG. 18 is different from the reset control process of FIG. 15 in that S150 that is the same as that in S150 (FIG. 3) of the second embodiment is added between S315 and S320.

14-3. Effect

According to the fourteenth embodiment, not only the same effect as that of the above-described thirteenth embodiment is achieved but also the same effect as that of the second embodiment is achieved.

In the fourteenth embodiment, the CPU 11 functions as the reset execution unit by executing the reset control process of FIG. 18. S110, S130, S150 and S320 in the reset control process of FIG. 18 correspond to the processing of the reset execution unit.

15. Fifteenth Embodiment

15-1. Difference from Thirteenth Embodiment

Since a basic configuration of the fifteenth embodiment is the same as that of the thirteenth embodiment, only differences from the thirteenth embodiment will be described below. The same reference numerals and symbols as in the thirteenth embodiment denote the same structural components and operations, and reference is made to the preceding description.

Figure 19:
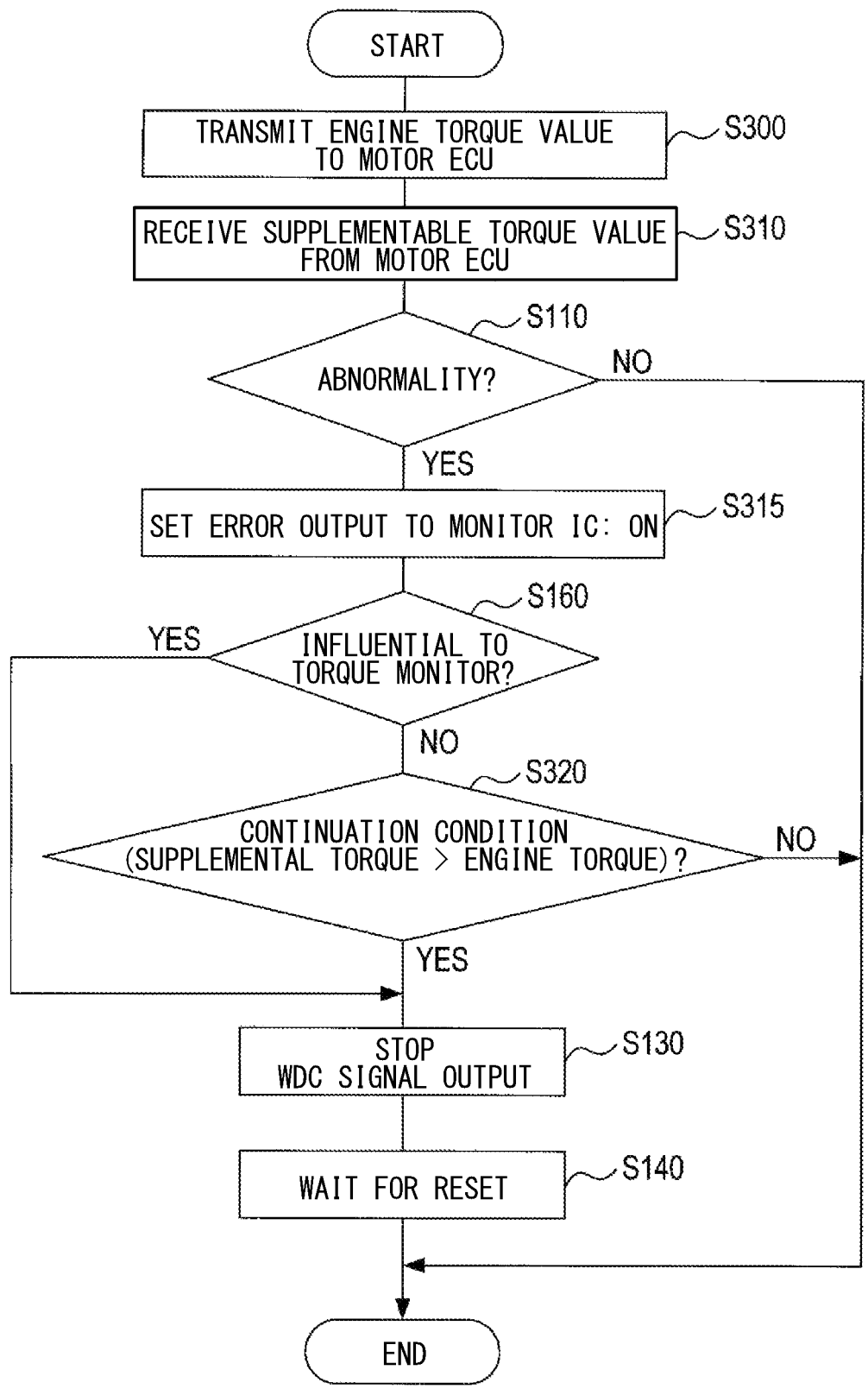
FIG. 19 is a flowchart of a reset control process executed in the fifteenth embodiment.

The ECU 1 of the fifteenth embodiment is different from that of the thirteenth embodiment in that the CPU 11 executes a reset control process of FIG. 19 instead of the reset control process of FIG. 15.

15-2. Processing

The reset control process of FIG. 19 is different from the reset control process of FIG. 15 in that S160 that is the same as in the third embodiment (FIG. 4) is added between S315 and S320. The difference from S320 is that S160, which is the same as that in FIG. 4 of the third embodiment, is added.

15-3. Effect

According to the fifteenth embodiment, not only the same effect as that of the above-described thirteenth embodiment is achieved but also the same effect as that of the third embodiment is achieved.

In the fifteenth embodiment, the CPU 11 functions as the reset execution unit by executing the reset control process of FIG. 19. S110, S130, S160 and S320 in the reset control process of FIG. 19 correspond to the processing of the reset execution unit.

16. Sixteenth Embodiment

16-1. Difference from Fourteenth Embodiment

Since a basic configuration of the sixteenth embodiment is the same as that of the fourteenth embodiment, only differences from the fourteenth embodiment will be described below. The same reference numerals and symbols as in the fourteenth embodiment denote the same structural components and operations, and reference is made to the preceding description.

Figure 20:
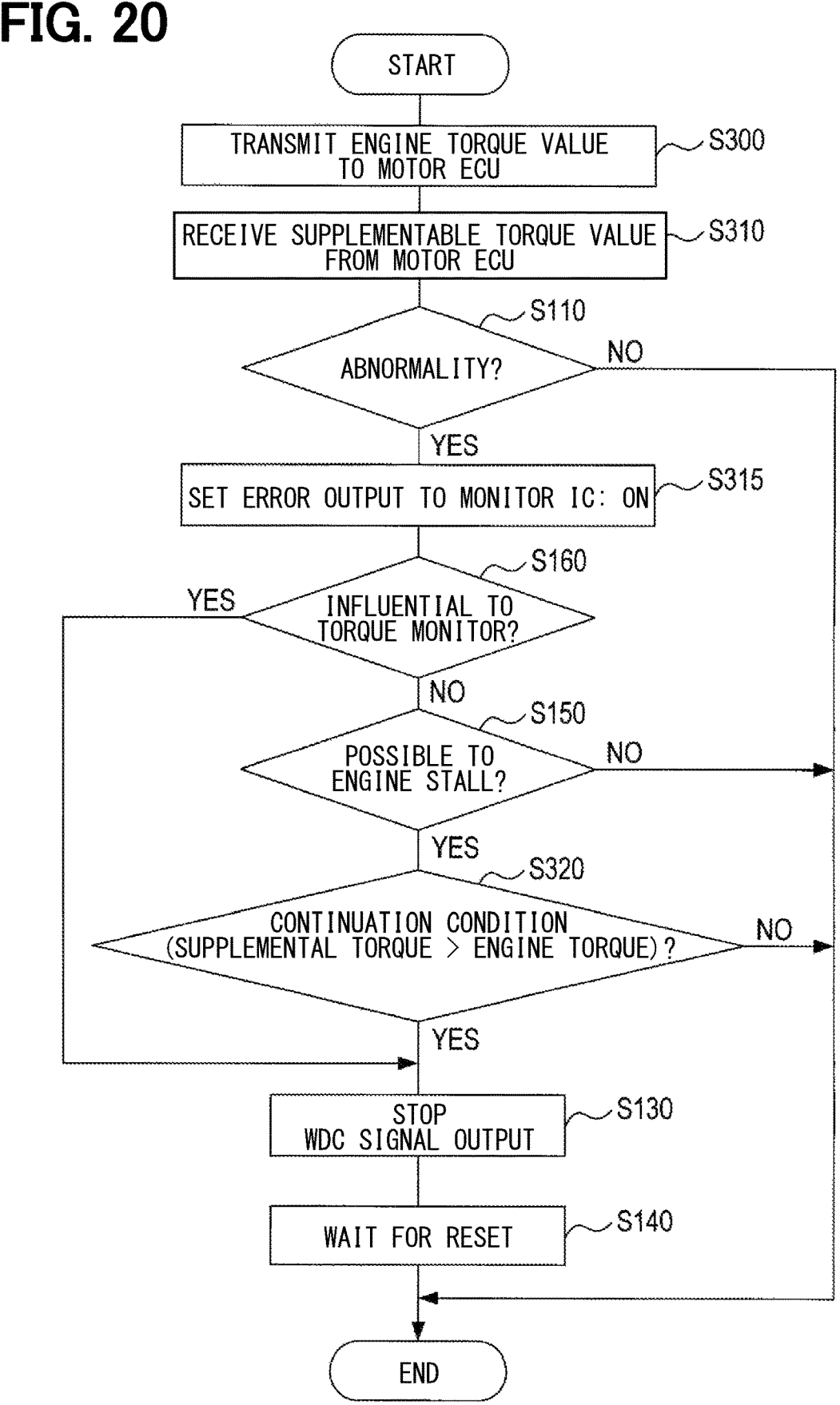
FIG. 20 is a flowchart of a reset control process executed in the sixteenth embodiment.

The ECU 1 of the sixteenth embodiment is different from that of the fourteenth embodiment in that the CPU 11 executes a reset control process of FIG. 20 instead of the reset control process of FIG. 18.

16-2. Processing

The reset control process of FIG. 20 is different from the reset control process of FIG. 18 in that S160 that is the same as in the third embodiment (FIG. 4) is added between S315 and S150. The difference from S320 is that S160, which is the same as that in FIG. 4 of the third embodiment, is added.

16-3. Effect

According to the sixteenth embodiment, the effect of the thirteenth embodiment described above is achieved, and further the effects described in the second embodiment and the third embodiment are achieved.

In the sixteenth embodiment, the CPU 11 functions as the reset execution unit by executing the reset control process of FIG. 20. S110, S130, S150, S160 and S320 in the reset control process of FIG. 20 are processing executed by the reset execution unit.

17. Seventeenth Embodiment

17-1. Difference from Thirteenth Embodiment

Since a basic configuration of the seventeenth embodiment is the same as that of the thirteenth embodiment, only differences from the thirteenth embodiment will be described below. The same reference numerals and symbols as in the thirteenth embodiment denote the same structural components and operations, and reference is made to the preceding description.

Figure 21:
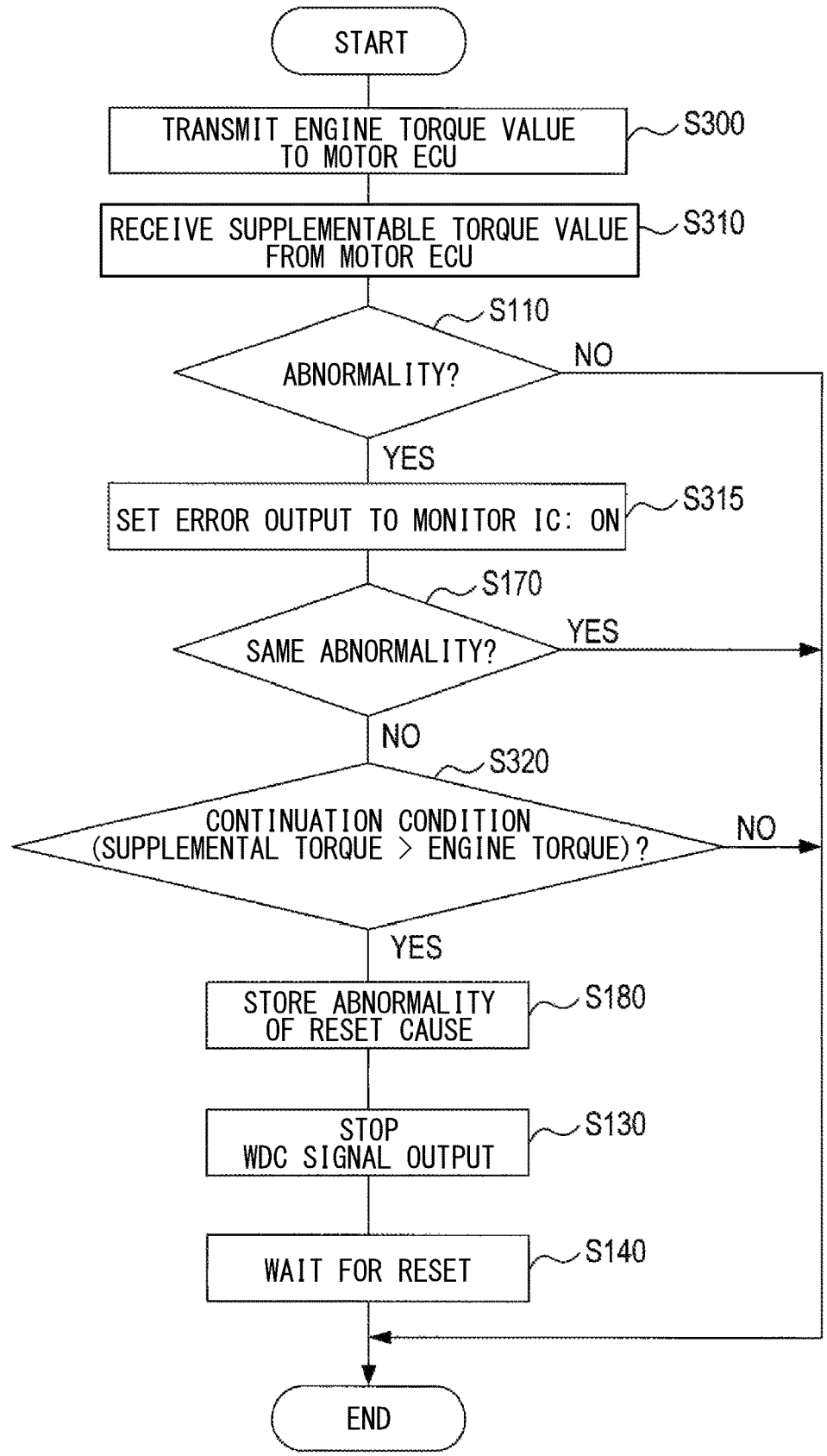
FIG. 21 is a flowchart of a reset control process executed in the seventeenth embodiment.

The ECU 1 of the seventeenth embodiment is different from that of the thirteenth embodiment in that the CPU 11 executes a reset control process of FIG. 21 instead of the reset control process of FIG. 15.

17-2. Processing

The reset control process of FIG. 21 is different from the reset control process of FIG. 15 in that S170 that is the same as in the fifth embodiment (FIG. 6) is added between S315 and S320. Further, S180 that is the same as in the fifth embodiment (FIG. 6) is added between S320 and S130.

17-3. Effect

According to the seventeenth embodiment, not only the same effect as that of the above-described thirteenth embodiment is achieved but also the same effect as that of the fifth embodiment is achieved.

In the seventeenth embodiment, the CPU 11 functions as the reset execution unit by executing the reset control process of FIG. 21. S110, S130, S170, S180 and S320 in the reset control process of FIG. 21 are processing executed by the reset execution unit.

18. Eighteenth Embodiment

18-1. Difference from Thirteenth Embodiment

Since a basic configuration of the eighteenth embodiment is the same as that of the thirteenth embodiment, only differences from the thirteenth embodiment will be described below. The same reference numerals and symbols as in the thirteenth embodiment denote the same structural components and operations, and reference is made to the preceding description.

Figure 22:
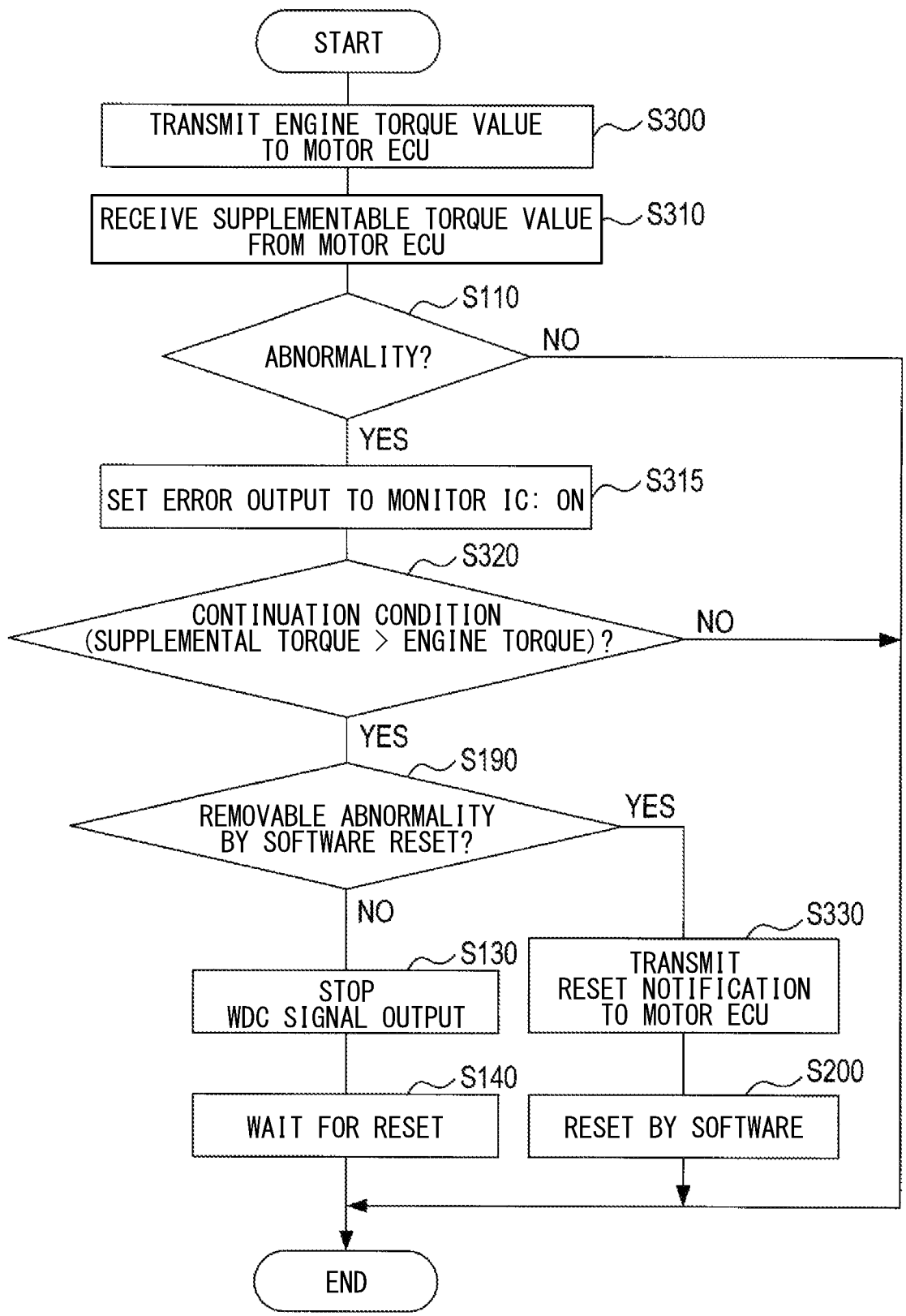
FIG. 22 is a flowchart of a reset control process executed in the eighteenth embodiment.

The ECU 1 of the eighteenth embodiment is different from that of the thirteenth embodiment in that the CPU 11 executes a reset control process of FIG. 22 instead of the reset control process of FIG. 15.

18-2. Processing

The reset control process of FIG. 22 differs from the reset control process of FIG. 15 in the following points.

First, between S320 and S130, the same S190 as in FIG. 7 of the sixth embodiment is added. Further, S330 and S200 which are the same as in FIG. 7 are added as processing executed when a determination result of S190 is YES, that is, when it is determined that the detected abnormality is an abnormality that can be removed by the software reset.

In S330, the CPU 11 transmits the reset notification described above to the motor ECU 33 so that the motor ECU 33 executes the process of S530 in FIG. 17. That is, the output torque of the engine is compensated with the supplemental torque by the motor 31. After that, the CPU 11 executes the software reset of the microcomputer 3 in S200. Therefore, the output torque of the engine is compensated by the motor 31 in both cases where the hardware reset of the microcomputer 3 is executed and where software reset of the microcomputer 3 is executed.

18-3. Effect

According to the eighteenth embodiment, the effect of the above-described thirteenth embodiment is exhibited, and further it is possible to execute the reset similarly to the sixth embodiment in correspondence to the content of the abnormality that has occurred.

In the eighteenth embodiment, the CPU 11 functions as the reset execution unit by executing the reset control process of FIG. 22. S110, S130, S190, S200 and S320 in the reset control process of FIG. 22 are processing executed by the reset execution unit.

19. Other Embodiment

While the embodiments of the present disclosure have been described above, the present disclosure is not limited to the above embodiment and can be variously modified as exemplified below.

For example, the processing of S170 and S180 in FIG. 6 may be added to the reset control process of any of FIG. 3 to FIG. 5. Similarly, the processing of S170 and S180 in FIG. 12 may be added to the reset control process of any of FIG. 9 to FIG. 11, and the processing of S170 and S180 of FIG. 21 may be added to the reset control process of any of FIG. 18 to FIG. 20. Further, the software reset of the microcomputer 3 may be executed in S130 of FIG. 2 to FIG. 6, FIG. 8 to FIG. 12, FIG. 15, and FIG. 18 to FIG. 21.

Further, in each of the above-described embodiments, it may be determined whether at least two of the following three conditions are satisfied in S120, S220 and S320 that correspond to the processing as the condition determination unit. The three conditions are that the engine speed is higher than the predetermined threshold engine speed value Na, the vehicle speed is higher than the predetermined threshold vehicle speed value Va, and that all or part of the torque output by the engine can be supplemented by the motor 31. The vehicle drive power source other than the engine is not limited to the motor 31 and may be, for example, another engine different from the engine controlled by the microcomputer 3.

The ECU and the methods described in the present disclosure may be implemented by a dedicated computer provided by configuring a processor and memory programmed to execute one or more functions embodied by a computer program. Alternatively, the ECU and the method described in the present disclosure may be implemented by a dedicated computer provided by configuring a processor with one or more dedicated hardware logic circuits. Alternatively, the ECU and the method described in the present disclosure may be implemented by one or more dedicated computers configured by combinations of processors and memories programmed to execute one or more functions and processors configured by one or more hardware logic circuits. The computer program may also be stored on a computer readable non-transitory tangible recording medium as instructions to be executed by a computer. The method for realizing the functions of the respective units included in the ECU does not necessarily need to include software, and all of the functions may be realized by use of one or more hardware.

In addition, the multiple functions of one component in the above embodiment may be realized by multiple components, or a function of one component may be realized by multiple components. In addition, multiple functions of multiple components may be realized by one component, or a function realized by the multiple components may be realized by one component. In addition, a part of the configuration of the above embodiment may be omitted. At least a part of the configuration in the above embodiments may be added to or replaced with another configuration in the above embodiments.

Differently from the ECU 1 described above, the present disclosure may be realized in various forms such as a system including the ECU as a component, a program for causing a computer to function as the ECU, a non-transitory tangible recording medium such as a semiconductor memory in which the program is recorded, and a microcomputer reset method.

What is claimed is:

1. An engine control device comprising:
a microcomputer configured to execute at least a process of controlling an engine of a vehicle; and
a processor configured to
reset the microcomputer when a predetermined condition is satisfied;
detect an abnormality of the microcomputer;
responsive to detecting the abnormality of the microcomputer, determine whether a continuation condition exists that is the predetermined condition under which the vehicle is able to continue traveling even when the microcomputer is reset by the processor; and
execute the reset of the microcomputer responsive to condition that the abnormality of the microcomputer is detected by the processor and that the continuation condition is determined as being satisfied,
wherein:
the continuation condition which the processor determines includes a condition indicating that a vehicle speed is higher than a threshold vehicle speed value.

2. The engine control device according to claim 1, wherein:
the continuation condition which the processor determines includes a condition indicating that an engine rotation speed is higher than a threshold engine speed value.

3. The engine control device according to claim 1, wherein the processor is further configured to:
determine whether the abnormality detected by the processor is an abnormality that has a possibility of causing an engine stall; and
execute the reset of the microcomputer on condition that the abnormality of the microcomputer is determined as having the possibility of causing the engine stall.

4. The engine control device according to claim 1, wherein:
the microcomputer is configured to execute an output monitor process that suppresses an output of the engine when the output of the engine is not controlled to a target output calculated by the microcomputer;
the processor is further configured to
determine whether the abnormality detected by the processor is influential on the output monitor process; and
execute the reset of the microcomputer regardless of any other conditions when the abnormality detected by the processor is determined as being influential on the output monitor.

5. The engine control device according to claim 1, wherein the processor is further configured to:
determine whether the abnormality detected by the processor presently is a same abnormality as detected previously by the processor when the microcomputer has been reset previously by the processor; and
cause the microcomputer to continue engine control without executing the reset of the microcomputer when the abnormality detected by the processor presently is the same as the abnormality detected previously.

6. The engine control device according to claim 1, wherein the processor is further configured to:
determine whether the abnormality detected by the processor is removable by a software reset of the microcomputer;
execute the software reset of the microcomputer, when the abnormality of the microcomputer is detected by the processor, the continuation condition is determined by the processor as being satisfied, and the abnormality detected by the processor is determined by the processor as being removable by the software reset of the microcomputer; and
execute a hardware reset of the microcomputer, when the abnormality of the microcomputer is detected by the processor, the continuation condition is determined by the processor as being satisfied, and the abnormality detected by the processor is determined by the processor as being not removable by the software reset of the microcomputer.

7. An engine control device comprising:
a microcomputer configured to execute at least a process of controlling an engine of a vehicle; and
a processor configured to
reset the microcomputer when a predetermined condition is satisfied;
detect an abnormality of the microcomputer;
responsive to detecting the abnormality of the microcomputer, determine whether a continuation condition exists that is the predetermined condition under which the vehicle is able to continue traveling even when the microcomputer is reset by the processor; and execute the reset of the microcomputer responsive to condition that the abnormality of the microcomputer is detected by the processor and that the continuation condition is determined as being satisfied, wherein:

the continuation condition which the processor determines includes a condition indicating that all or a part of torque output by the engine is able to be supplemented by a vehicle drive power source other than the engine.

8. The engine control device according to claim 7, wherein:

the continuation condition which the processor determines includes a condition indicating that an engine rotation speed is higher than a threshold engine speed value.

9. The engine control device according to claim 7, wherein the processor is further configured to:

determine whether the abnormality detected by the processor is an abnormality that has a possibility of causing an engine stall; and execute the reset of the microcomputer on condition that the abnormality of the microcomputer is determined as having the possibility of causing the engine stall.

10. The engine control device according to claim 7, wherein:

the microcomputer is configured to execute an output monitor process that suppresses an output of the engine when the output of the engine is not controlled to a target output calculated by the microcomputer;

the processor is further configured to determine whether the abnormality detected by the processor is influential on the output monitor process; and execute the reset of the microcomputer regardless of any other conditions when the abnormality detected by the processor is determined as being influential on the output monitor.

11. The engine control device according to claim 7, wherein the processor is further configured to:

determine whether the abnormality detected by the processor presently is a same abnormality as detected previously by the processor when the microcomputer has been reset previously by the processor; and cause the microcomputer to continue engine control without executing the reset of the microcomputer when the abnormality detected by the processor presently is the same as the abnormality detected previously.

12. The engine control device according to claim 7, wherein the processor is further configured to:

determine whether the abnormality detected by the processor is removable by a software reset of the microcomputer;

execute the software reset of the microcomputer, when the abnormality of the microcomputer is detected by the processor, the continuation condition is determined by the processor as being satisfied, and the abnormality detected by the processor is determined by the processor as being removable by the software reset of the microcomputer; and execute a hardware reset of the microcomputer, when the abnormality of the microcomputer is detected by the processor, the continuation condition is determined by the processor as being satisfied, and the abnormality detected by the processor is determined by the processor as being not removable by the software reset of the microcomputer.

13. An engine control device comprising:

a microcomputer configured to execute at least a process of controlling an engine of a vehicle; and a processor configured to reset the microcomputer when a predetermined condition is satisfied;

detect an abnormality of the microcomputer;

responsive to detecting the abnormality of the microcomputer, determine whether a continuation condition exists that is the predetermined condition under which the vehicle is able to continue traveling even when the microcomputer is reset by the processor; and execute the reset of the microcomputer responsive to condition that the abnormality of the microcomputer is detected by the processor and that the continuation condition is determined as being satisfied, wherein:

the continuation condition which the processor determines includes at least two of conditions indicating that an engine rotation speed is higher than a threshold engine speed value, that a vehicle speed is higher than a threshold vehicle speed value, and that all or a part of torque output by the engine is able to be supplemented by a vehicle drive power source other than the engine.

14. The engine control device according to claim 13, wherein the processor is further configured to:

determine whether the abnormality detected by the processor is an abnormality that has a possibility of causing an engine stall; and execute the reset of the microcomputer on condition that the abnormality of the microcomputer is determined as having the possibility of causing the engine stall.

15. The engine control device according to claim 13, wherein:

the microcomputer is configured to execute an output monitor process that suppresses an output of the engine when the output of the engine is not controlled to a target output calculated by the microcomputer;

the processor is further configured to determine whether the abnormality detected by the processor is influential on the output monitor process; and execute the reset of the microcomputer regardless of any other conditions when the abnormality detected by the processor is determined as being influential on the output monitor.

16. The engine control device according to claim 13, wherein the processor is further configured to:

determine whether the abnormality detected by the processor presently is a same abnormality as detected previously by the processor when the microcomputer has been reset previously by the processor; and cause the microcomputer to continue engine control without executing the reset of the microcomputer when the abnormality detected by the processor presently is the same as the abnormality detected previously.

17. The engine control device according to claim 13, wherein the processor is further configured to:

determine whether the abnormality detected by the processor is removable by a software reset of the microcomputer;

execute the software reset of the microcomputer, when the abnormality of the microcomputer is detected by the processor, the continuation condition is determined by the processor as being satisfied, and the abnormality detected by the processor is determined by the processor as being removable by the software reset of the microcomputer; and execute a hardware reset of the microcomputer, when the abnormality of the microcomputer is detected by the processor, the continuation condition is determined by the processor as being satisfied, and the abnormality detected by the processor is determined by the processor as being not removable by the software reset of the microcomputer.

* * * * *